US012579754B2

(12) United States Patent (10) Patent No.: US 12,579,754 B2
Ito (45) Date of Patent: Mar. 17, 2026

(54) INFORMATION PROCESSING DEVICE AND INFORMATION PROCESSING METHOD

(71) Applicant: SONY GROUP CORPORATION, Tokyo (JP)

(72) Inventor: Kiyomi Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 63 days.

(21) Appl. No.: 18/573,319

(22) PCT Filed: Feb. 18, 2022

(86) PCT No.: PCT/JP2022/006694
§ 371 (c)(1),
(2) Date: Dec. 21, 2023

(87) PCT Pub. No.: WO2023/276252
PCT Pub. Date: Jan. 5, 2023

(65) Prior Publication Data
US 2024/0338897 A1 Oct. 10, 2024

(30) Foreign Application Priority Data

Jun. 30, 2021 (JP) ................................. 2021-109216

(51) Int. Cl.
*G06F 3/00* (2006.01)
*G06F 3/01* (2006.01)
*G06T 19/00* (2011.01)
(52) U.S. Cl.
CPC .............. *G06T 19/00* (2013.01); *G06F 3/013* (2013.01)
(58) Field of Classification Search
None
See application file for complete search history.

(56) References Cited

U.S. PATENT DOCUMENTS 10,796,489 B1 10/2020 Cordes
2019/0104235 A1* 4/2019 Sarkar ................... H04N 21/47
(Continued)

FOREIGN PATENT DOCUMENTS

JP 2014-123376 A 7/2014
JP 2018-037092 A 3/2018
(Continued)

OTHER PUBLICATIONS

Norman Murray, et al., "Eye gaze in virtual environments: evaluating the need and initial work on implementation", Concurrency and Computation: Practice and Experience, Wiley InterScience, London, GB,vol. 21,Feb. 13, 2009 (Feb. 12, 2009), pp. 1437-1449, XP072306083.
(Continued)

*Primary Examiner* — Martin Mushambo
(74) *Attorney, Agent, or Firm* — CHIP LAW GROUP

(57) ABSTRACT

A natural interaction between a performer and an audience is realized through a virtual space. An information processing device according to the present disclosure includes: a presentation unit configured to present an image representing an audience avatar group disposed in at least one virtual space in a display region visually recognizable by a performer corresponding to a performer avatar disposed in the virtual space; and a control unit configured to control the performer avatar in the at least one virtual space on the basis of a motion of the performer with respect to the audience avatar group represented by the image presented in the display region.

19 Claims, 20 Drawing Sheets

(56) References Cited

U.S. PATENT DOCUMENTS

| | | | |
|---|---|---|---|
| 2019/0224564 A1 | 7/2019 | Marks | |
| 2019/0250699 A1* | 8/2019 | Mulase | G06F 3/04842 |
| 2019/0333261 A1* | 10/2019 | Nakashima | G06F 3/011 |
| 2020/0363636 A1* | 11/2020 | Karafin | G03H 1/0443 |
| 2020/0404344 A1* | 12/2020 | Bathory | H04N 21/2187 |
| 2024/0077941 A1* | 3/2024 | Homma | H04N 21/44218 |

FOREIGN PATENT DOCUMENTS

| | | | | |
|---|---|---|---|---|
| JP | 2019146148 A | | 8/2019 | |
| JP | 2020004284 A | * | 1/2020 | |
| JP | 2020-042575 A | | 3/2020 | |
| JP | 2021077257 A | * | 5/2021 | |
| WO | 2016/009865 A1 | | 1/2016 | |
| WO | 2020/017261 A1 | | 1/2020 | |
| WO | 2021/095573 A1 | | 5/2021 | |

OTHER PUBLICATIONS

International Search Report and Written Opinion of PCT Application No. PCT/JP2022/006694, issued on Mar. 22, 2022, 09 pages of ISRWO.

* cited by examiner

*FIG. 14*

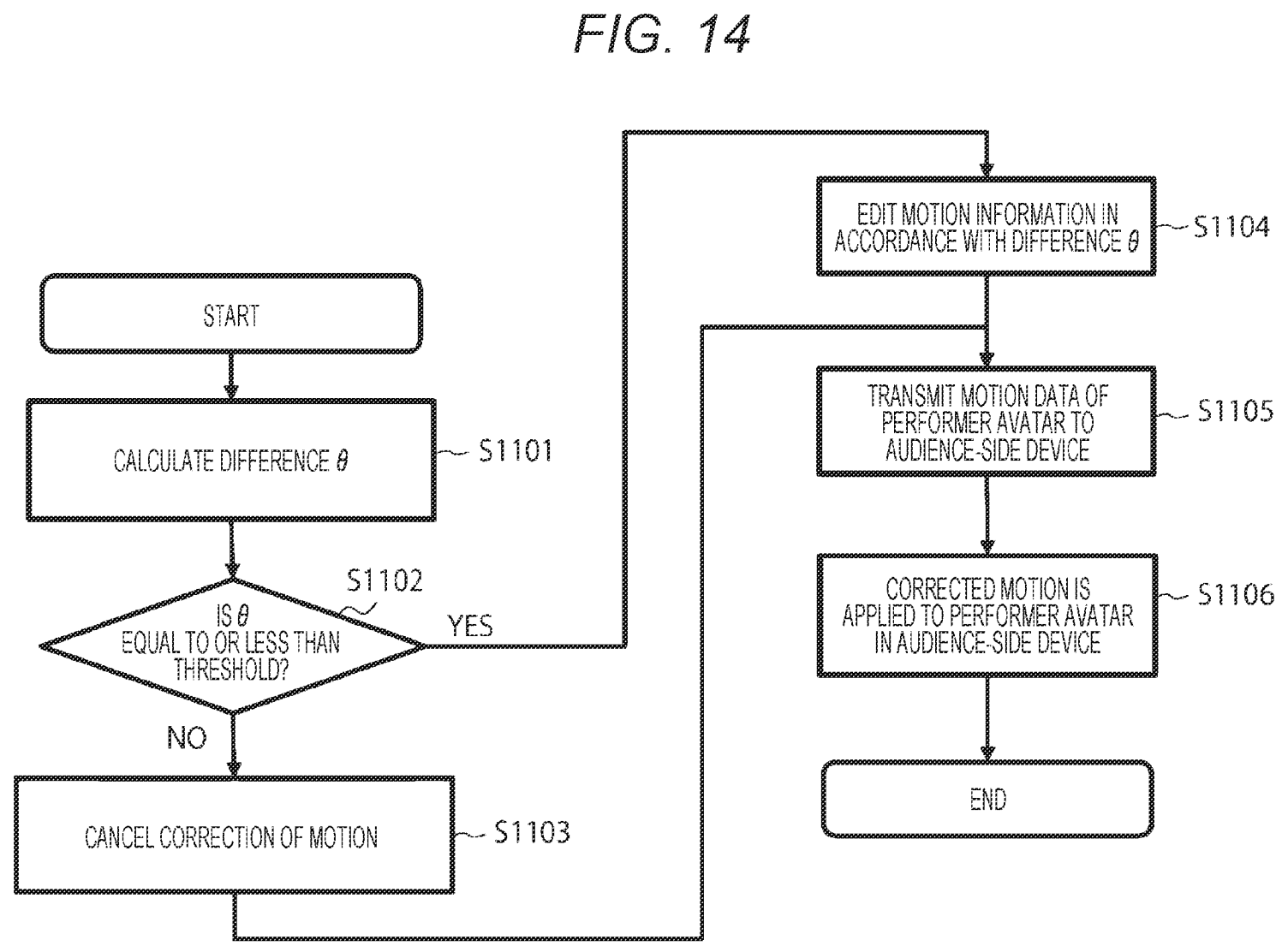

START

CALCULATE DIFFERENCE $\theta$ ～ S1101

IS $\theta$ EQUAL TO OR LESS THAN THRESHOLD? ～ S1102

YES

NO

CANCEL CORRECTION OF MOTION ～ S1103

EDIT MOTION INFORMATION IN ACCORDANCE WITH DIFFERENCE $\theta$ ～ S1104

TRANSMIT MOTION DATA OF PERFORMER AVATAR TO AUDIENCE-SIDE DEVICE ～ S1105

CORRECTED MOTION IS APPLIED TO PERFORMER AVATAR IN AUDIENCE-SIDE DEVICE ～ S1106

END

*FIG. 15*

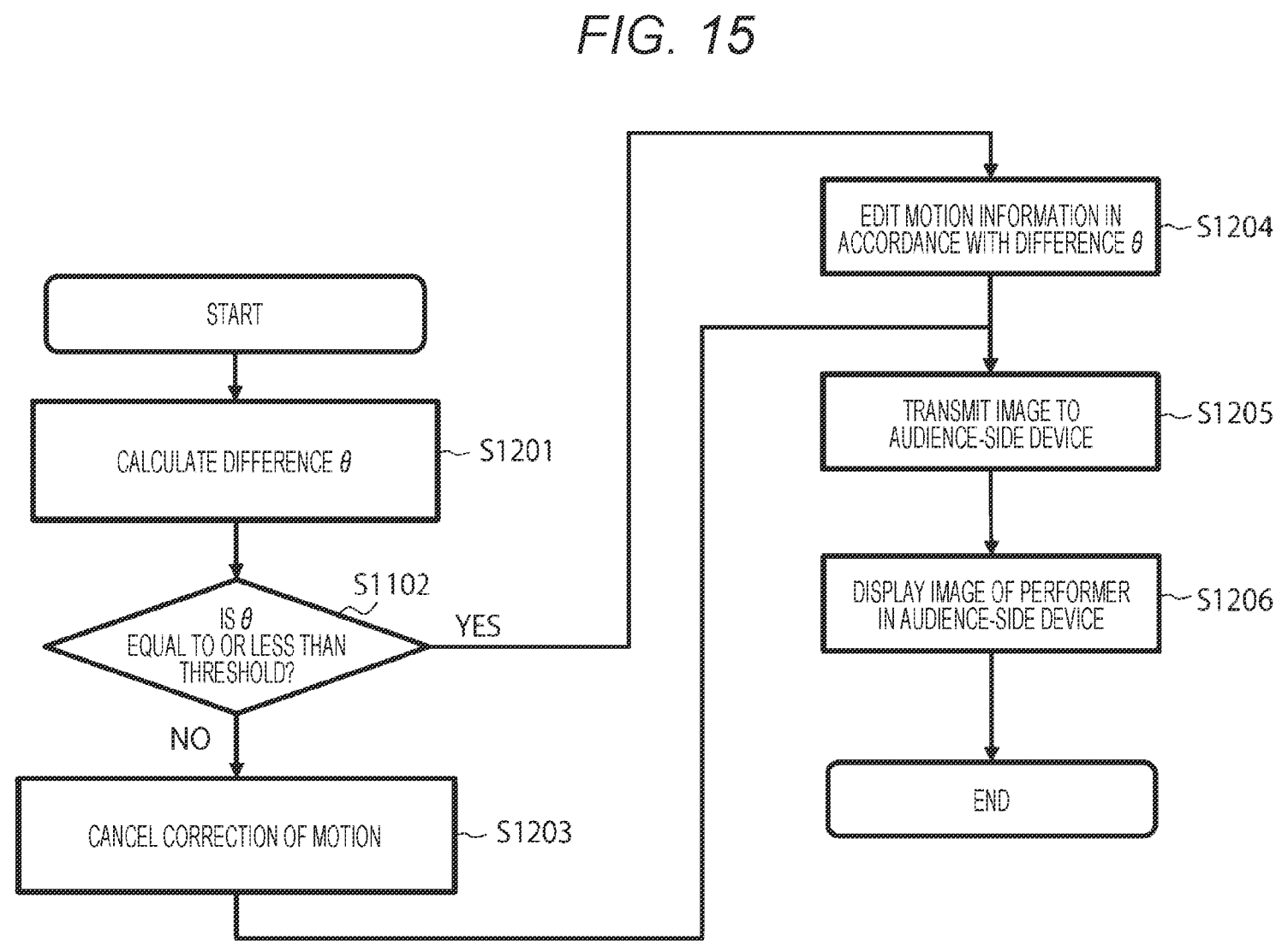

EDIT MOTION INFORMATION IN ACCORDANCE WITH DIFFERENCE $\theta$ — S1204

TRANSMIT IMAGE TO AUDIENCE-SIDE DEVICE — S1205

DISPLAY IMAGE OF PERFORMER IN AUDIENCE-SIDE DEVICE — S1206

END

START

CALCULATE DIFFERENCE $\theta$ — S1201

IS $\theta$ EQUAL TO OR LESS THAN THRESHOLD? — S1102

YES

NO

CANCEL CORRECTION OF MOTION — S1203

*FIG. 16*

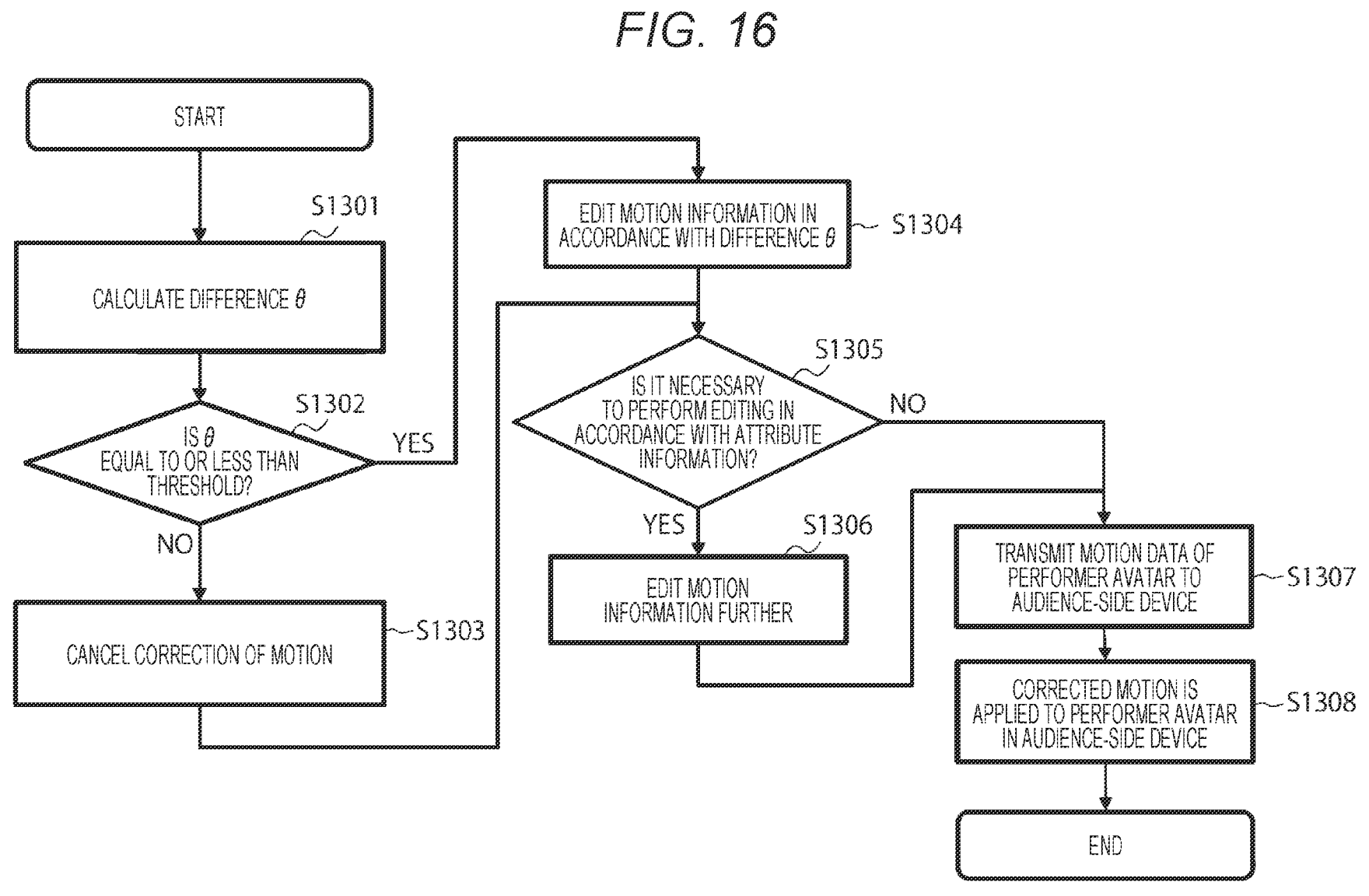

START

S1301
CALCULATE DIFFERENCE θ

S1302
IS θ EQUAL TO OR LESS THAN THRESHOLD?

YES

S1304
EDIT MOTION INFORMATION IN ACCORDANCE WITH DIFFERENCE θ

S1305
IS IT NECESSARY TO PERFORM EDITING IN ACCORDANCE WITH ATTRIBUTE INFORMATION?

NO

YES

S1306
EDIT MOTION INFORMATION FURTHER

NO

S1303
CANCEL CORRECTION OF MOTION

S1307
TRANSMIT MOTION DATA OF PERFORMER AVATAR TO AUDIENCE-SIDE DEVICE

S1308
CORRECTED MOTION IS APPLIED TO PERFORMER AVATAR IN AUDIENCE-SIDE DEVICE

END

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/006694 filed on Feb. 18, 2022, which claims priority benefit of Japanese Patent Application No. JP 2021-109216 filed in the Japan Patent Office on Jun. 30, 2021. Each of the above-referenced applications is hereby incorporated herein by reference in its entirety.

TECHNICAL FIELD

The present disclosure relates to an information processing device, an information processing method, and a program.

BACKGROUND ART

In a virtual live performance in a virtual space that many people can access at the same time, it is possible to perform the live performance in a situation where an artist (performer) and a viewer are not at the same place. In the live performance in the virtual space, an audience avatar representing an audience and an avatar representing the artist (performer avatar) are disposed in the virtual space, and thus the audience recognizes the performer avatar disposed in the virtual space as the artist. The performer avatar is causes to perform a motion in synchronization with the actual motion of the artist in a studio or the like. In such a virtual live performance in the virtual space, not only a live performance in a single venue but also a live performance in a plurality of venues can be performed at the same time.

Currently, in a live performance in a form in which the artist and the viewer are not at the same place, there is the following interaction between the artist and the user. For example, in live viewing, a fan service in which the artist waves a hand toward a delivery camera is performed. Furthermore, in a live performance delivered to the terminal, there is an interaction in which the audience member writes a comment and the artist reads the comment.

In the virtual live performance in the virtual space, the artist and the audience can share the same space. Therefore, it is only required to have a mechanism in which the artist reacts while looking at the state of a user in each venue (the state of a user avatar) to realize natural interaction between the artist and the audience by making use of this advantage.

CITATION LIST

Patent Document

Patent Document 1: Japanese Patent Application Laid-Open No. 2018-37092

Patent Document 2: Japanese Patent Application Laid-Open No. 2020-042575

Patent Document 3: Japanese Patent Application Laid-Open No. 2014-123376

SUMMARY OF THE INVENTION

Problems to be Solved by the Invention

The present disclosure has been made in view of the above-described problems, and an object thereof is to realize natural interaction between a performer and an audience via a virtual space.

Solutions to Problems

An information processing device according to the present disclosure includes: a presentation unit configured to present an image representing an audience avatar group disposed in at least one virtual space in a display region visually recognizable by a performer corresponding to a performer avatar disposed in the virtual space; and a control unit configured to control the performer avatar in the at least one virtual space on the basis of a motion of the performer with respect to the audience avatar group represented by the image presented in the display region.

An information processing method according to the present disclosure includes: presenting an image representing an audience avatar group disposed in at least one virtual space in a display region visually recognizable by a performer corresponding to a performer avatar disposed in the virtual space; and controlling the performer avatar in the at least one virtual space on the basis of a motion of the performer with respect to the audience avatar group represented by the image presented in the display region.

A computer program according to the present disclosure causes a computer to execute: a step of presenting an image representing an audience avatar group disposed in at least one virtual space in a display region visually recognizable by a performer corresponding to a performer avatar disposed in the virtual space; and a step of controlling the performer avatar in the at least one virtual space on the basis of a motion of the performer with respect to the audience avatar group represented by the image presented in the display region.

BRIEF DESCRIPTION OF DRAWINGS

FIG. 14 is a flowchart illustrating an example of a flow of motion editing processing of an information processing device according to the embodiment of the present disclosure.

FIG. 15 is a flowchart illustrating a modification example of FIG. 14.

FIG. 16 is a flowchart illustrating a flow of processing of editing a motion of a performer avatar according to an attribute of a virtual space.

FIG. 20 is a block diagram illustrating an example of a configuration of hardware of a computer that executes a series of processing of an information processing device according to the present disclosure with a program.

MODE FOR CARRYING OUT THE INVENTION

Figure 1:
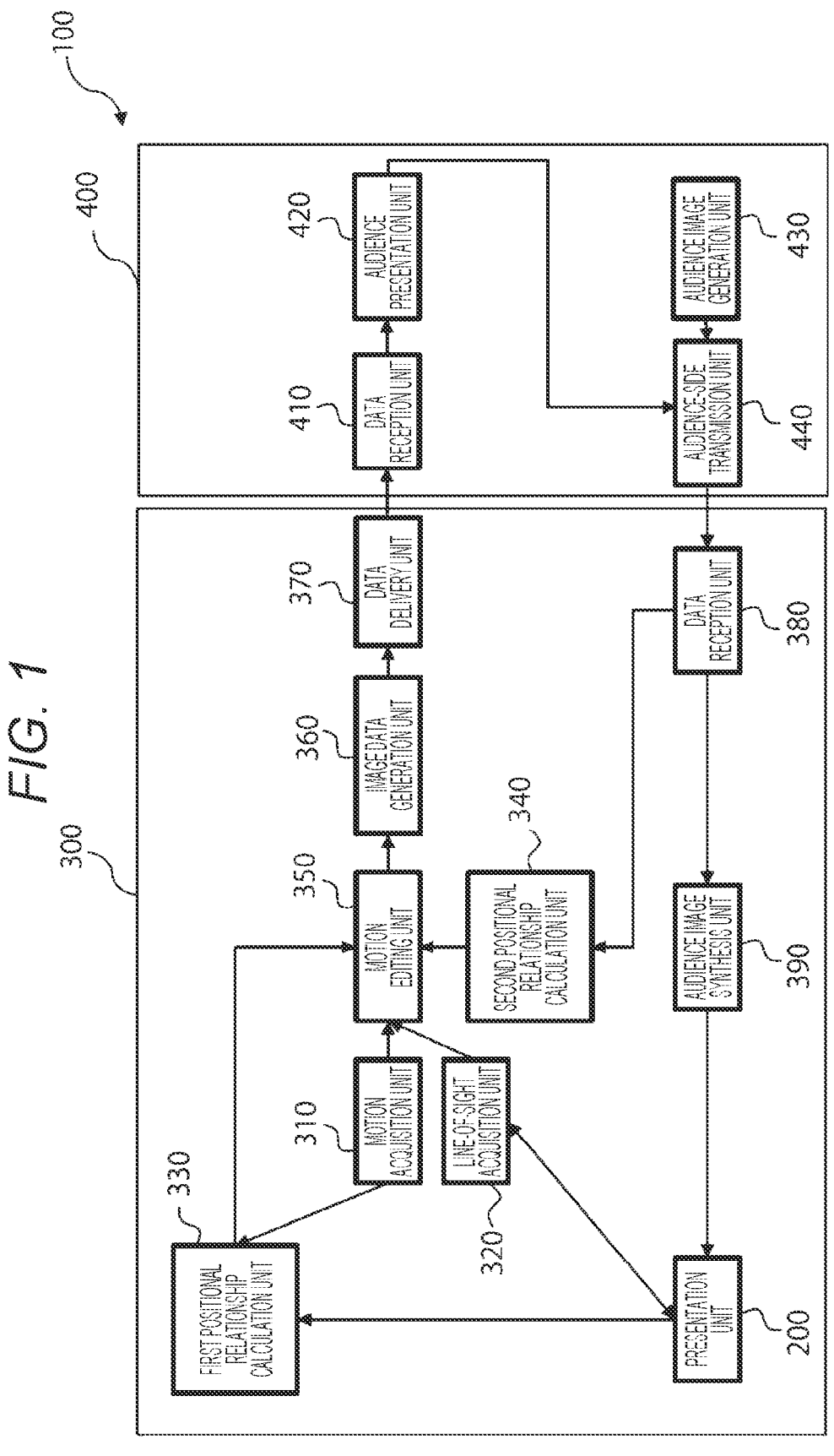
FIG. 1 is a block diagram of an information processing device according to the present disclosure.

FIG. 1 is a block diagram of an information processing system 100 according to an embodiment of the present disclosure. The information processing system 100 includes a performer-side device 300 as an information processing device according to the present embodiment and an audience-side device 400.

The performer-side device 300 (information processing device) includes a motion acquisition unit 310, a line-of-sight acquisition unit 320, a first positional relationship calculation unit 330, a second positional relationship calculation unit 340, a motion editing unit 350, an image data generation unit 360, a data delivery unit 370, a data reception unit 380, an audience image synthesis unit 390, and a presentation unit 200. A control unit according to the present embodiment has at least one function of the motion acquisition unit 310, the line-of-sight acquisition unit 320, the first positional relationship calculation unit 330, the second positional relationship calculation unit 340, the motion editing unit 350, the image data generation unit 360, the data delivery unit 370, the data reception unit 380, and the audience image synthesis unit 390.

The audience-side device 400 includes a data reception unit 410, an audience presentation unit 420, an audience image generation unit 430, and an audience-side transmission unit 440. Although only one audience-side device 400 is illustrated, a plurality of the audience-side devices 400 is actually present according to the number of audiences, the number of audience groups, or the number of virtual spaces. For example, the audience-side device 400 may be present for each audience member.

In the present embodiment, a performer avatar corresponding to a performer and an audience avatar corresponding to an audience are disposed in a venue that is a virtual space, and natural interaction between the performer and the audience is realized in a situation where the performer avatar performs a live performance. Here, the performer avatar is an object that is disposed in the virtual space and reflects the motion of the performer. Hereinafter, the virtual space and the performer avatar will be described.

(Virtual Space)

In the virtual space of the embodiment of the present disclosure, a venue for a live performance is set up, and in the venue, a performer avatar, an audience avatar group that is a group of the audience avatars, a stage that is a stage on which the performer avatar performs a performance, a guest seat where each audience avatar looks at the performer avatar on the stage, and the like are disposed.

One or more virtual spaces are provided, and a venue is set up for each virtual space. Attribute information may be set for each virtual space. The attribute information of the virtual space may be, for example, an attribute of the audience avatar group disposed in the virtual space (language used by the audience group, residential area, or the like). In the virtual space, a service or a motion according to the attribute information of the virtual space may be performed. For example, the language spoken by the performer may be converted into the language indicated by the attribute information of the virtual space. Furthermore, the audience may select a virtual space having attribute information desired by the audience and participate in the live performance in the selected virtual space.

(Performer Avatar)

Figure 2:
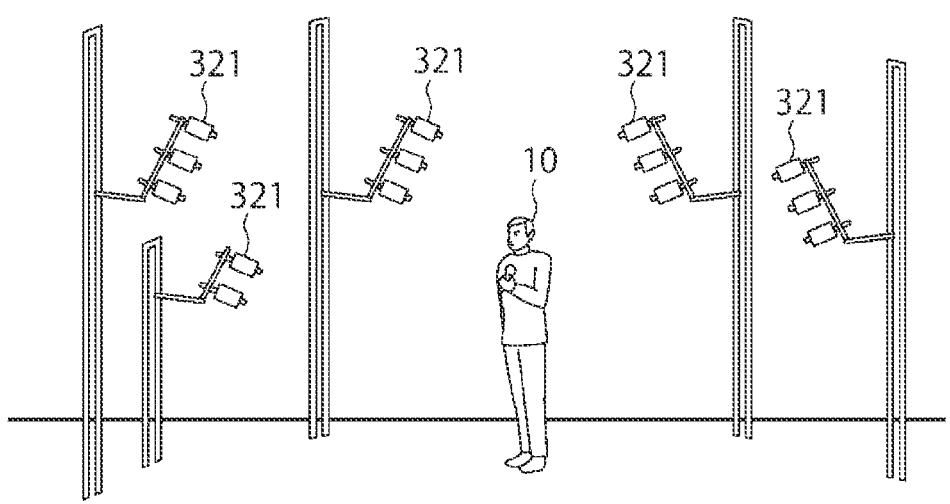
FIG. 2 is a view of a system for acquiring motion of a performer.
Figure 3:
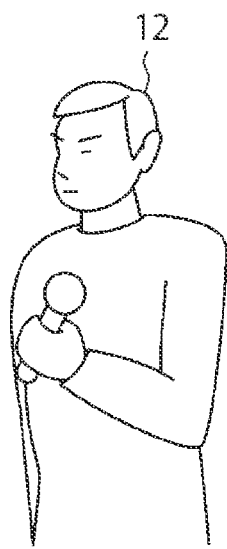
FIG. 3 is a view of modeling for creating a content from an acquired motion.
Figure 4A:
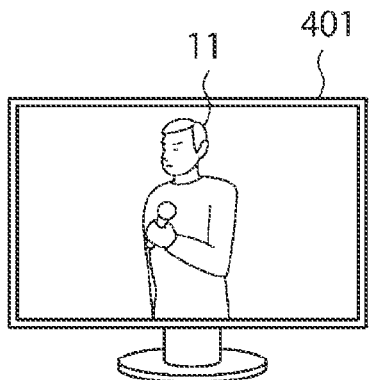
FIGS. 4A and 4B are views illustrating an example of a display method for displaying a performer avatar.
Figure 4B:
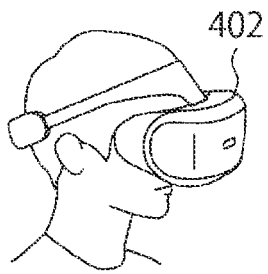

FIG. 2 is a view illustrating an imaging environment for imaging the motion of a performer 10 and generating a three-dimensional model. FIG. 3 is a view for explaining modeling for creating a three-dimensional model 12 from the acquired motion. FIGS. 4A and 4B are views of an example of displaying the created three-dimensional model 12 as a performer avatar 11.

In FIG. 2, the performer 10 performs a live performance in the imaging environment. A camera 321 images the performer 10 at a constant sampling rate. The camera 321 may be singular or plural as illustrated in FIG. 2 in order to image the performer from various angles. Note that a display unit (presentation unit 200 in FIG. 1) that displays an image of the audience avatar group in the virtual space is disposed in front of, or around the performer 10. Therefore, the performer 10 can perform a performance while watching the situation of the audience avatar group in each venue. Note that a microphone may be disposed in the imaging environment of FIG. 2 (for example, the performer 10 may have a microphone), and the voice of the performer 10 may be collected at a constant sampling rate.

Next, from the collection of image data acquired by the camera 321, an object converted into three-dimensional data is generated as the three-dimensional model 12 as illustrated in FIG. 3. For example, a visual hull method or the like can be used to generate the three-dimensional model.

Next, by rendering the generated three-dimensional model 12 at an arbitrary viewpoint, as illustrated in FIGS. 4A and 4B, the performer avatar 11 can be displayed on the audience-side device (audience presentation unit 420). The performer avatar 11 may be transmitted to the audience-side device by rendering the three-dimensional model 12 as image data. Motion data may be transmitted to the audience-side device and the performer avatar 11 may be rendered on the audience-side device. The performer avatar 11 can be reproduced on a display 401 as in FIG. 4A or reproduced on a head mounted display 402 as in FIG. 4B. Thus, the performer avatar 11 is presented to the audience corresponding to the audience avatar. The display 401 of FIG. 4A can be viewed by a single audience or a plurality of audiences (audience group). In the case of the head mounted display 402 of FIG. 4B, the head mounted display 402 is provided for each audience member. Note that in a case where the voice of the performer is collected by the microphone, voice data is also transmitted to the audience-side device together with the rendering data or motion data of the performer avatar 11, and the voice is output in synchronization with the motion of the performer avatar 11.

Hereinafter, the details of the information processing system 100 in FIG. 1 will be described.

The audience-side device 400 may be either a viewing device for each audience member or a viewing device common to the audience group. The viewing device may be any device such as an HMD, a monitor, a TV, or a PC. In the following description, it is assumed that the audience-side device 400 is a viewing device for each audience member. However, in a situation where the audience group views the same display at the same time in each virtual space, one audience-side device 400 may be provided in common for the audience group in each virtual space.

The audience image generation unit 430 generates an image representing the audience avatar in the virtual space. As the image representing the audience avatar, for example, the audience image generation unit 430 may generate an image obtained by imaging a part of the body (for example, a face) of the audience member viewing the audience-side device 400 as an image representing the audience avatar. Alternatively, the audience image generation unit 430 may generate an image representing the audience avatar by rendering the audience avatar in the virtual space. The image representing the audience avatar is, for example, an image in which the viewpoint of the audience (viewpoint of the virtual camera in the virtual space) is placed toward the position of the performer avatar in the virtual space. That is, the image of the audience avatar viewed from the performer avatar is generated. As described above, the image representing the audience avatar may be an image of the audience member or an image of the audience avatar (character selected by the audience).

The audience-side transmission unit 440 transmits the image representing the audience avatar generated by the audience image generation unit 430 to the performer-side device 300. The data reception unit 380 of the performer-side device 300 receives the image representing the audience avatar from each audience-side device 400. The audience-side transmission unit 440 is connected to the performer-side device 300 via a wired or wireless network. The wired or wireless network includes the Internet, a cellular communication network, and a wireless local area network (LAN).

The audience image synthesis unit 390 in the performer-side device 300 synthesizes the images representing the audience avatar received by the data reception unit 380, and displays the synthesized images on the presentation unit 200.

The presentation unit 200 displays the image synthesized by the audience image synthesis unit 390 in a display region visually recognizable by the performer. As a result, the image representing the audience avatar in each virtual space (for example, the image obtained by imaging the audience member corresponding to the audience avatar or the image of the character selected by the audience member) is displayed so as to be visible to the performer. For example, the presentation unit 200 is disposed in front of the performer 10 in a studio. The presentation unit 200 is, for example, a display device such as a liquid crystal display device or an organic EL display device, and in this case, the display region is a screen of the display device. The presentation unit 200 may include a plurality of displays corresponding to a plurality of the display regions, or may divide the display region of one display into a plurality of regions. The presentation unit 200 may be a device (spatial image display device) that displays an image in a real space, and in this case, the display region is a partial region of the space in which the image is displayed. Furthermore, the presentation unit 200 may be a projector that projects an image on a screen, and in this case, the display region is a projection region on which the image of the projector is projected.

Figure 5:
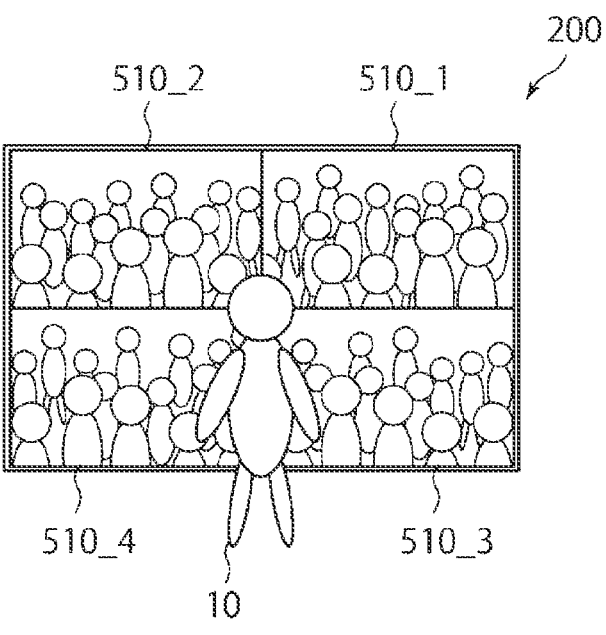
FIG. 5 is a view illustrating an example of a presentation unit according to an embodiment of the present disclosure.

FIG. 5 illustrates an example of an audience avatar group presented (displayed) by the presentation unit 200. In the example of FIG. 5, a situation is assumed in which a live performance is simultaneously performed in four virtual spaces (virtual spaces 500_1, 500_2, 500_3, and 500_4, respectively). The audience avatar groups in the venues of virtual spaces are respectively displayed in different display regions. More details are as follows.

The presentation unit 200 illustrated in FIG. 5 has four tile-like display regions, and each display region corresponds to each of four virtual spaces. In each display region, a rectangular image including the audience avatar group in the virtual space is displayed. An audience avatar group 510_1 corresponding to the virtual space 500_1 is displayed in the upper right display region, an audience avatar group 510_2 corresponding to the virtual space 500_2 is displayed in the upper left display region, an audience avatar group 510_3 corresponding to the virtual space 500_3 is displayed in the lower right display region, and an audience avatar group 510_4 corresponding to the virtual space 500_4 is displayed in the lower left display region.

The performer 10 present in a real physical space (for example, present in an imaging studio) can recognize the audience groups respectively corresponding to the audience avatar groups 510_1 to 510_4 with the images of the audience avatar groups 510_1 to 510_4 presented in the display regions. In the following description, an arbitrary audience avatar or an arbitrary audience avatar group may be described as an audience avatar 510 or an audience avatar group 510.

A method by which the audience image synthesis unit 390 synthesizes images representing the audience avatar in each virtual space may be arbitrary. For example, the image of the audience avatar in the virtual space may be disposed at a random position in the display region corresponding to the virtual space. The image of the audience avatar may be compressed and displayed in a rectangular display region while maintaining the relative positional relationship of the audience avatar in the virtual space. Furthermore, synthesis may be performed by a method illustrated in FIG. 6 to be described below.

Figure 6:
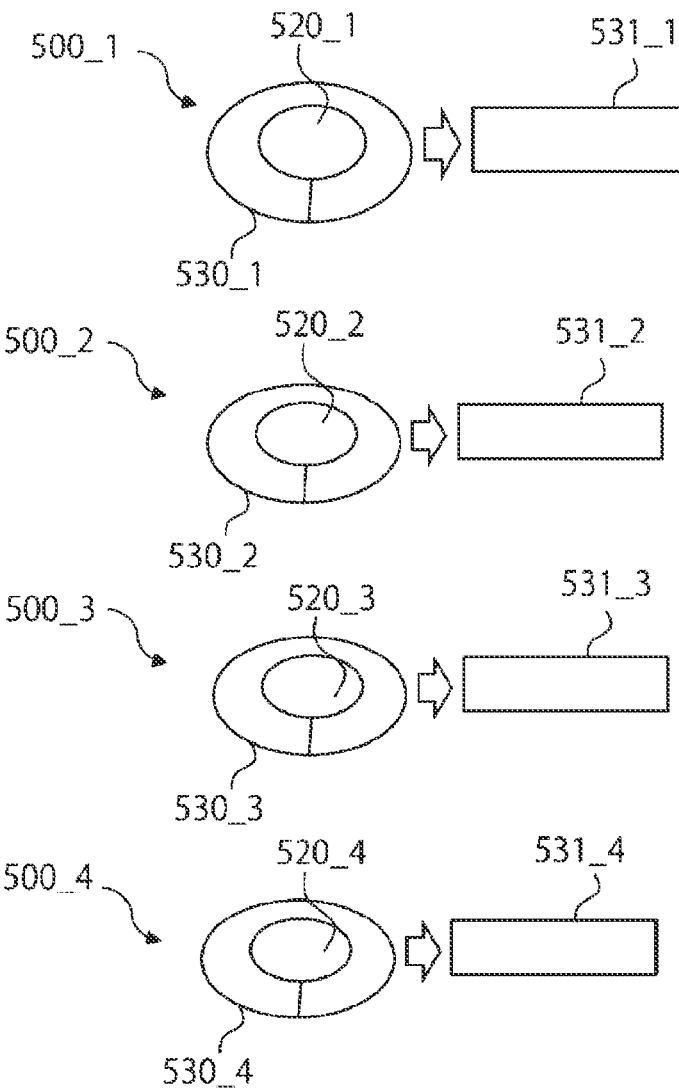
FIG. 6 is a view illustrating a state of deployment of guest seats in a virtual space.

FIG. 6 is a view illustrating an example of a synthesis method. In four virtual spaces 500 (500_1, 500_2, 500_3, and 500_4), stages 520 (520_1, 520_2, 520_3, and 520_4) and guest seats 530 (530_1, 530_2, 530_3, and 530_4) are provided. The performer avatar on each of the stages 520 and the audience avatar in each of the guest seats is not illustrated. In this case, the guest seats 530 (530_1, 530_2, 530_3, and 530_4) can be cut at appropriate positions as illustrated in FIG. 6 and deployed into rectangles 531_1, 531_2, 531_3, and 531_4. The images representing the audience avatar are synthesized by disposing the images representing the audience avatar in the display region corresponding to the virtual space according to the position of each audience avatar included in the rectangle.

The line-of-sight acquisition unit 320 acquires line-of-sight information of the performer 10 visually recognizing the display region of the presentation unit 200. As a method of acquiring the line-of-sight information, a direction of the line-of-sight may be specified on the basis of matching between a camera that images the eyes of the performer and a plurality of images of the eyes prepared in advance. Alternatively, in a case where the presentation unit 210 is a display unit of the HMD, the center of the image presented on the display unit of the HMD may be regarded as the direction of the line-of-sight.

The line-of-sight acquisition unit 320 detects which audience avatar or which audience avatar group the performer 10 looks at on the basis of the acquired line-of-sight information. For example, in a case where four audience avatar groups included in four virtual spaces are presented in the display regions, respectively, the line-of-sight acquisition unit 320 detects which audience avatar group or which audience avatar of the audience avatar group the performer 10 looks at. One or more audience avatars may be looked at. One or more audience avatar groups may be looked at. Alternatively, the line-of-sight acquisition unit 320 may detect which virtual space among the four virtual spaces is looked at. The audience avatar group the performer looks at may span a plurality of virtual spaces. At least one audience avatar the performer looks at corresponds to a first audience avatar according to the present disclosure.

The line-of-sight acquisition unit 320 provides the motion editing unit 350 and the presentation unit 200 with information (gaze audience information) specifying the audience avatar or audience avatar group that the performer looks at. The line-of-sight acquisition unit 320 may provide the motion editing unit 350 with line-of-sight information of the performer 10.

The presentation unit 200 may acquire information (gaze audience information) indicating the audience avatar or audience avatar group that the performer 10 is looking at from the line-of-sight acquisition unit 320, and display the audience member or audience group that the performer 10 looks at with emphasis in the display region. For example, the color of the audience member or audience group that performer 10 is looking at may be changed, and the audience member or the audience group may be surrounded by a thick line (refer to FIGS. 8A and 8B to be described later). Alternatively, the audience member that the performer 10 does not look at (non-gaze audience group) may be displayed in a blurred manner.

The motion acquisition unit 310 in the performer-side device 300 acquires motion information of the performer. The motion information also includes positional information of the performer. For example, the motion acquisition unit 310 acquires motion information of the performer 10 on the basis of image data obtained by imaging the performer 10 with the camera 321. Alternatively, the motion acquisition unit 310 may acquire positional information of one or more sensors attached to the body of the performer, and acquire motion information of the performer on the basis of the acquired positional information. The motion acquisition unit 310 provides the first positional relationship calculation unit 330 and the motion editing unit 350 with the acquired motion information.

As viewed from the performer 10, the first positional relationship calculation unit 330 calculates a positional relationship between the performer 10 and the audience avatar or audience avatar group shown in the image presented by the presentation unit 200, that is, a positional relationship (first positional relationship) of the viewpoint of the performer. The calculation of the positional relationship is performed on the basis of, for example, motion information (including position information) of the performer 10, positional information (for example, the arrangement position, height, and the like of the display) of the presentation unit 200, and positional information of the audience avatar or audience avatar group in the display region of the presentation unit 200. The first positional relationship includes, for example, information indicating in which vector direction from the position of the performer 10 the audience avatar or audience avatar group that the performer 10 looks at is present in the image presented in the display region. The position of the performer 10 as the reference may be a predetermined position (for example, eyes, a center of gravity, or the like) of the body of the performer, or may be a position determined by another method.

Here, the positional relationship between the performer 10 and the audience avatar presented in the display region does not necessarily coincide with the positional relationship between the performer avatar 11 and the audience avatar. For example, a certain audience avatar in the display region in the upper left of FIG. 5 as viewed from the performer 10 is present on the left front side, but the audience avatar may be present on the right side of the performer avatar 11 in the virtual space. Therefore, in a case where the motion of the performer 10 is reflected in the performer avatar 11, in order to realize natural interaction with the audience, it is necessary to consider the positional relationship (first positional relationship) between the performer 10 and the audience avatar presented in the display region. The first positional relationship calculation unit 330 transmits information indicating the calculated positional relationship between the performer 10 and the audience avatar (positional relationship information of the viewpoint of the performer) to the motion editing unit 350.

The second positional relationship calculation unit 340 calculates a positional relationship between the performer avatar 11 viewed from the audience avatar 510 (or audience member) and the audience avatar 510, that is, a positional relationship (second positional relationship) of the viewpoint of the audience member. In order to calculate the positional relationship, the position information of the audience avatar in the virtual space is transmitted from the audience-side transmission unit 440 in each audience-side device, and the positional information is received by the data reception unit 380 of the performer-side device 300. On the basis of this positional information, the second positional relationship calculation unit 340 calculates the positional relationship (second positional relationship) between the performer avatar and the audience avatar at the viewpoint of each audience member. The position of the audience avatar 510 may be any position as long as the position of the audience avatar 510 can be identified. For example, the position of the audience avatar 510 may be the position of a virtual camera in the virtual space.

As described above, the positional relationship between the performer 10 and the audience avatar presented in the display region does not necessarily coincide with the positional relationship between the performer avatar 11 and the audience avatar in the virtual space. Therefore, in a case where the motion of the performer 10 is reflected in the performer avatar 11, in order to realize natural interaction with the audience, it is necessary to consider the positional relationship (second positional relationship) between the performer 10 and the audience avatar 510 in the virtual space.

The second positional relationship calculation unit 340 provides the motion editing unit 350 with information indicating the calculated positional relationship between the performer avatar 11 and the audience avatar (positional relationship information of the viewpoint of the audience member) in the virtual space.

The motion editing unit 350 edits the motion information of the actual performer avatar 11 on the basis of the motion of the performer 10 and outputs the edited motion information as a content 12.

The motion editing unit 350 receives the positional relationship information of the viewpoint of the performer, the positional relationship information of the viewpoint of the audience member, the motion information of the performer, and the gaze audience information of the performer, and edits the motion information of the performer. The motion information is edited, for example, for each audience member or for each audience group (for each virtual section).

For example, a coordinate system of a real space in which the performer is present and a coordinate system of a virtual space in which the performer avatar is present are associated with each other, and a vector corresponding to a vector to the audience avatar looking at the performer as viewed from the performer (the audience avatar displayed in the display region) is specified in the virtual space. The performer avatar in the virtual space faces in the direction of the specified vector. The motion of the performer in the motion information is edited by a difference between the direction (angle) in which the performer avatar faces and the direction (angle) in which the audience avatar is present as viewed from the performer avatar in the virtual space. For example, the angle of the face, arm, or foot of the performer is rotated according to the difference. As a result, the action can be realized in which the performer avatar in the virtual space looks at the audience avatar (referred to as an audience avatar A) that the performer in the real space looks at in the display region.

For other audience avatars (audience avatars that the performer does not looks at) present in the same virtual space as the audience avatar A, motion information of the performer avatar is edited such that the performer avatar performs an action in which the performer avatar looks at the audience avatar A described above.

The motion information may not be edited for the audience avatar present in another virtual space different from the audience avatar A. Alternatively, a screen object (such as a back screen) indicating a state in the virtual space in which the audience avatar A is present may be disposed in another virtual space, and the motion information of the performer with respect to the another virtual space may be edited such that the performer avatar in the another virtual space performs an action of looking at the screen object or the audience avatar A displayed on the screen object.

A specific example of an action of changing the motion of the performer avatar for each audience member, each audience group, or each virtual space by editing the motion information will be described later.

Furthermore, the motion editing unit 350 may edit the motion information according to attribute information of the virtual space, for example, a culture of a linguistic area. For example, in a case where the performer performs a beckoning motion by bending the wrist with the palm facing downward, the motion information may be changed to a motion of bending the wrist with the palm facing upward for a virtual space of certain attribute information.

The image data generation unit 360 generates data of the performer avatar (performer object) to be provided to the audience-side device on the basis of the motion information edited by the motion editing unit 350. As an example, the data of the performer avatar is obtained by generating a three-dimensional object (or a two-dimensional object) described in FIGS. 2, 3, 4A, and 4B and rendering the generated three-dimensional object (or the generated two-dimensional object) as image data. In this case, in the audience-side device 400, the performer avatar is reproduced as an image on the basis of the rendering data.

As another example, the data of the performer avatar may be edited motion information. In this case, the edited motion information is applied to the performer avatar in the audience-side device, and the performer avatar performs a motion according to the edited motion information.

In the present example, it is assumed that the rendering data of the three-dimensional object is data of the performer avatar.

The data delivery unit 370 transmits the data of the performer object generated by the image data generation unit 360 to the audience-side device 400. The data delivery unit 370 is connected to the audience-side device 400 via a wired or wireless network. The wired or wireless network includes the Internet, a cellular communication network, and a wireless local area network (LAN).

The data reception unit 410 of the audience-side device 400 receives the data of the performer object delivered from the performer-side device 300. The data reception unit 410 provides the audience presentation unit 420 with the received data.

The audience presentation unit 420 displays the virtual space and the image indicating an object (a performer avatar, an audience object, various objects in a live performance venue, and the like) in the virtual space. For an object (audience avatar) of the audience member who wears or views the audience-side device 400, there may be either a configuration in which the audience avatar is not displayed or a configuration in which the audience avatar is displayed. The audience presentation unit 420 generates an image showing the state of a virtual space 500 from the viewpoint of the virtual camera on the basis of the virtual camera of the audience set in the virtual space. The virtual camera is set, for example, at the head of the audience avatar (for example, eye position). The generated image (including a performer avatar, another audience avatar, a stage, a guest seat, and the like) is visually recognized by the audience.

Hereinafter, the embodiment of the present disclosure will be described in more detail by using specific examples.

Figure 7:
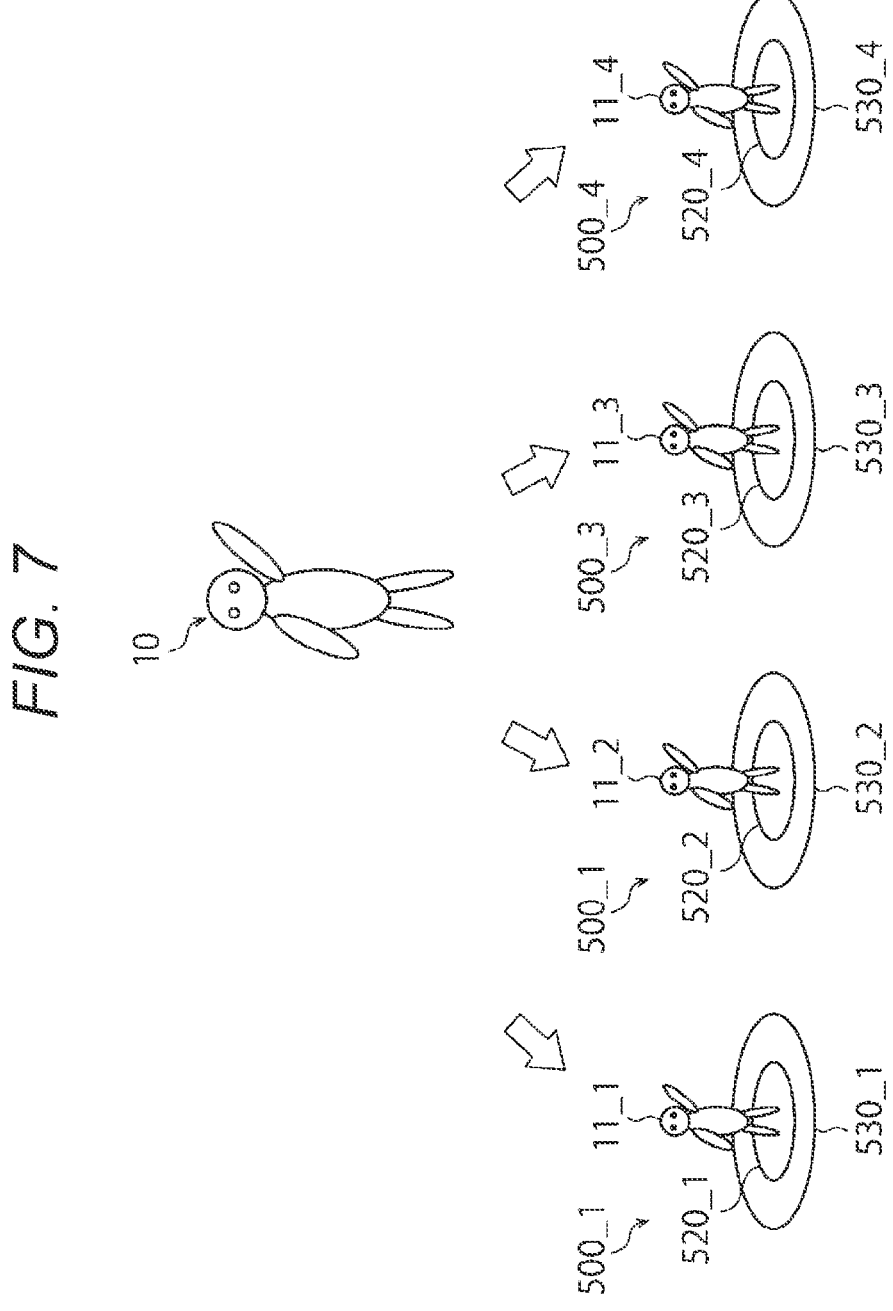
FIG. 7 is a view illustrating a state in which a performer avatar reflects a motion of a performer.

FIG. 7 is a view illustrating a state in which the performer avatars 11 (11_1 to 11_4) in the virtual spaces 500 (500_1 to 500_4) move according to the motion of the performer 10 in the real space. The virtual spaces 500_1 to 500_4 include performer avatars 11_1 to 11_4, stages 520_1 to 520_4 on which the performer avatars 11_1 to 11_4 perform a performance, and guest seats 530 (530_1 to 530_4) that are spaces where the audience avatar group views the performer avatar. The performer avatars 11_1 to 11_4 perform the same motion as the performer 10 in the virtual space 500 according to the motion of the performer 10. When the performer 10 performs the motion of raising the left arm as illustrated in FIG. 7, the performer avatar 11 similarly performs the motion of raising the left arm in conjunction with this motion. Note that, in this example, the motion information is not edited.

Figure 8A:
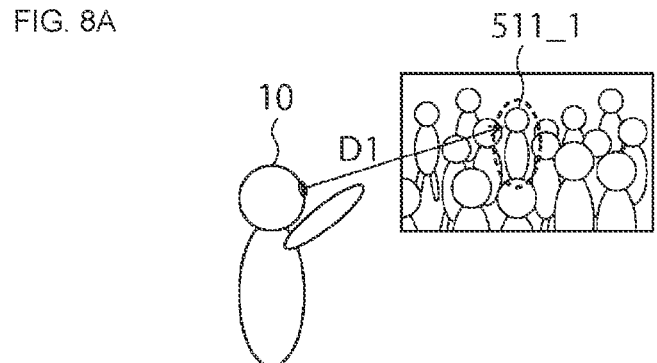
FIGS. 8A and 8B are views in which a performer and a performer avatar perform an interaction motion.

FIG. 8A illustrates an example in which the performer 10 performs an action of looking at an audience avatar 511_1 in the audience avatar group in a certain virtual space and waving a hand. Since the audience avatar 511_1 is surrounded by a thick line or is highlighted with a specific color, it is easy for the performer 10 to visually recognize that the audience avatar 511_1 is an audience avatar that the performer 10 looks at. The direction of the line-of-sight of the performer 10 is a direction D1.

Figure 8B:
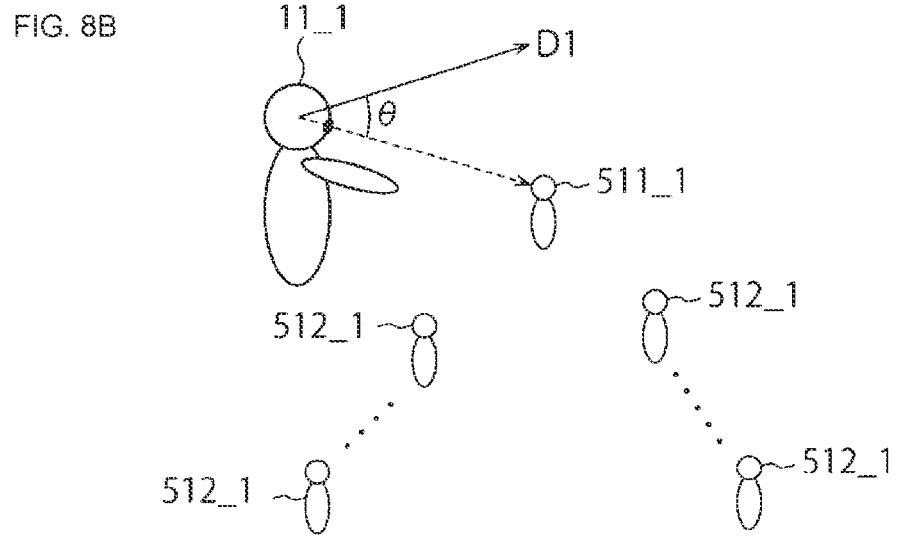

FIG. 8B illustrates a state of a performer avatar 11_1 and a state of an audience avatar group in the virtual space where the audience avatar 511_1 is present. The audience avatar group includes an audience avatar 511_1 and another audience avatar 511_2. In a case where the motion information of the performer 10 is not edited, that is, in a case where the motion of the performer avatar 11_1 is not corrected, the performer avatar 11_1 performs a motion of waving a hand while looking in the direction D1. When viewed from the audience avatar 511_1 and the audience avatar 511_2, the performer avatar 11_1 is seen waving a hand toward a direction different from the direction of the audience avatar 511_1. On the other hand, in the present embodiment, the motion information is edited according to a difference (angle difference) θ between a direction in which the performer avatar 11_1 looks and a direction in which the audience avatar 511_1 is present. As a result, the performer avatar 11_1 looks at the audience avatar 511_1 and performs a motion of waving a hand. The audience member corresponding to the audience avatar 511_1 sees the performer avatar 11_1 waving a hand toward the audience member. The audience member corresponding to the audience avatar 511_2 sees the performer avatar 11_1 waving a hand toward the audience avatar 511_1. Note that a configuration in which the motion information is not corrected for the audience avatar 512_1 also can be obtained.

Figures 9A, 9B:
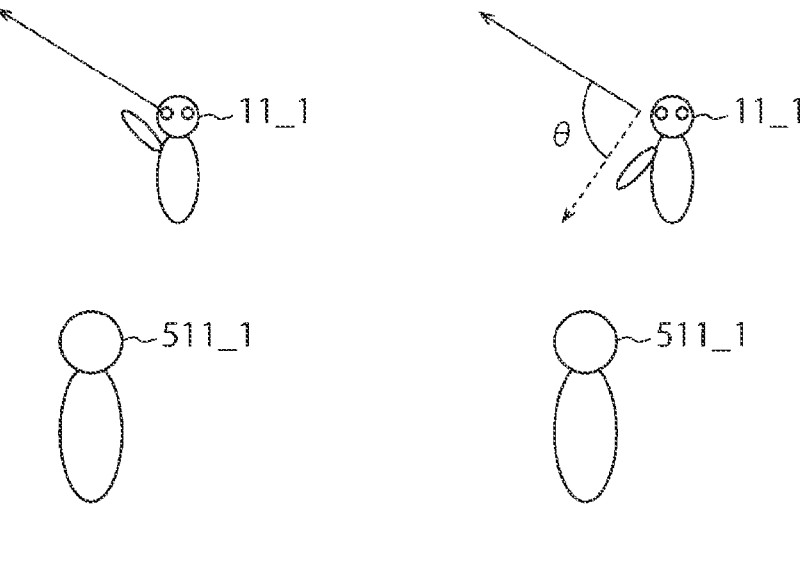
FIGS. 9A and 9B are views of a performer avatar viewed from a guest seat.

FIG. 9A illustrates an example in which the audience avatar 511_1 looks at the performer avatar 11_1 in a case where the motion information is not edited. The performer avatar 11_1 is waving a hand while looking in a direction different from the audience avatar 511_1. FIG. 9B illustrates an example in which the audience avatar 511_1 looks at the performer avatar 11_1 as a result of editing the motion information. The performer avatar 11_1 is waving a hand while looking at the audience avatar 511_1. The audience member corresponding to another audience avatar 511_2 (refer to FIG. 8B) also sees the performer avatar 11_1 waving a hand toward the audience avatar 511_1.

Figure 10A:
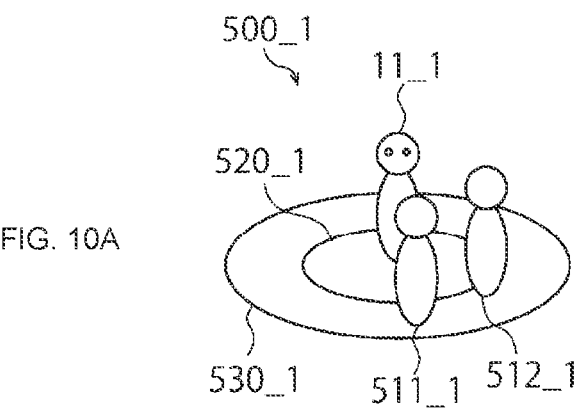
FIGS. 10A, 10B, and 10C are views illustrating a positional relationship and appearance of audience avatars in a virtual space.
Figure 10B:
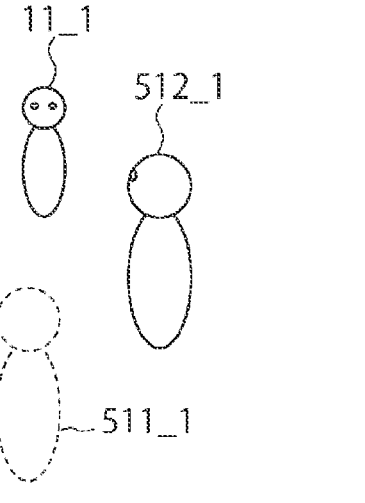
Figure 10C:
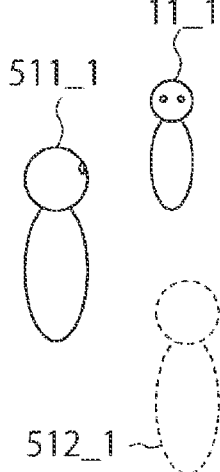

FIGS. 10A, 10B, and 10C are views for explaining fields of view of the audience avatar 511_1 and audience avatar 511_2. FIG. 10A illustrates a state inside the virtual space 500_1. FIG. 10B illustrates the field of view of the audience avatar 511_1, and FIG. 10C illustrates the field of view of the audience avatar 511_2. The audience avatar 512_1 is seen in a right direction with respect to a direction facing the performer avatar 11_1 with the audience avatar 511_1 as a reference. On the other hand, the audience avatar 511_1 is seen in a left direction with respect to a direction facing the performer avatar 11_1 with the audience avatar 512_1 as a reference. As a result, the audience avatar can look at the performer avatar 11_1 from the front regardless of the position of the guest seat 530_1, and the positional relationship with other audience members is maintained.

The motion editing unit 350 may determine whether or not to edit the motion information (correct the motion of the performer avatar) according to the angle difference θ (refer to FIG. 8A and 8B or 9A and 9B). Specifically, when the angle difference θ is equal to or less than a threshold, the motion information is edited (the motion of the performer avatar is corrected) as illustrated in FIG. 8B or 9B. When the angle difference θ is greater than the threshold, the motion is unnatural, and the motion information is not edited (the motion of the performer avatar is not corrected).

In the above description, an example of correction of the motion of the performer avatar in the virtual space in which the audience object that the performer looks at is present has been described, but an example of correction of the motion of the performer avatar in another virtual space will be described.

Figure 11:
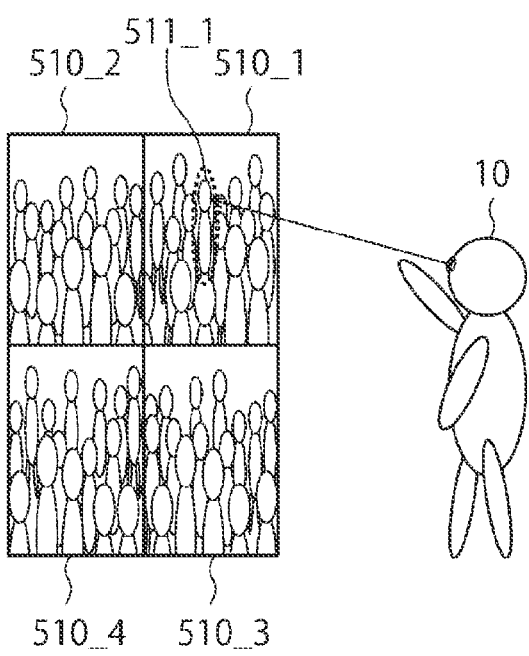
FIG. 11 is a view illustrating a performer who performs an interaction motion for an audience avatar in a virtual space.

FIG. 11 illustrates a motion in which the performer 10 looks at the audience avatar 511_1 from the audience avatar group 510_1 in the virtual space 500_1 corresponding to the upper right display region among a plurality of the display regions presented on the presentation unit 200 and waves a hand.

Figure 12A:
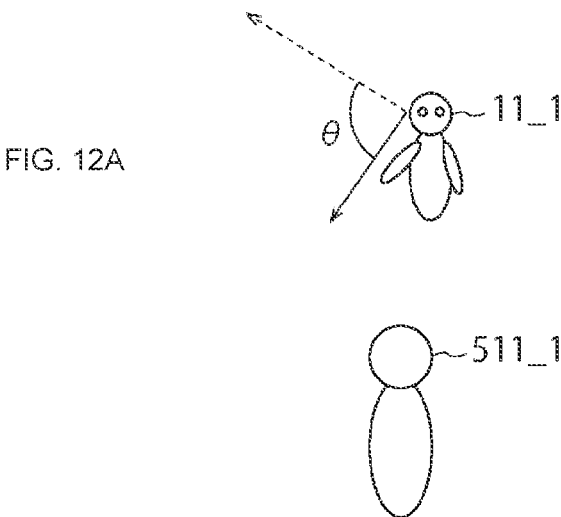
FIGS. 12A and 12B are views illustrating a performer avatar viewed from an audience avatar in a virtual space that is not a target of an interaction motion.

FIG. 12A illustrates an example of correction of the motion of the performer avatar 11_1 in the virtual space 500_1 in which the audience avatar 511_1 is present. This example is similar to FIG. 9B described above, and thus description thereof will be omitted.

Figure 12B:
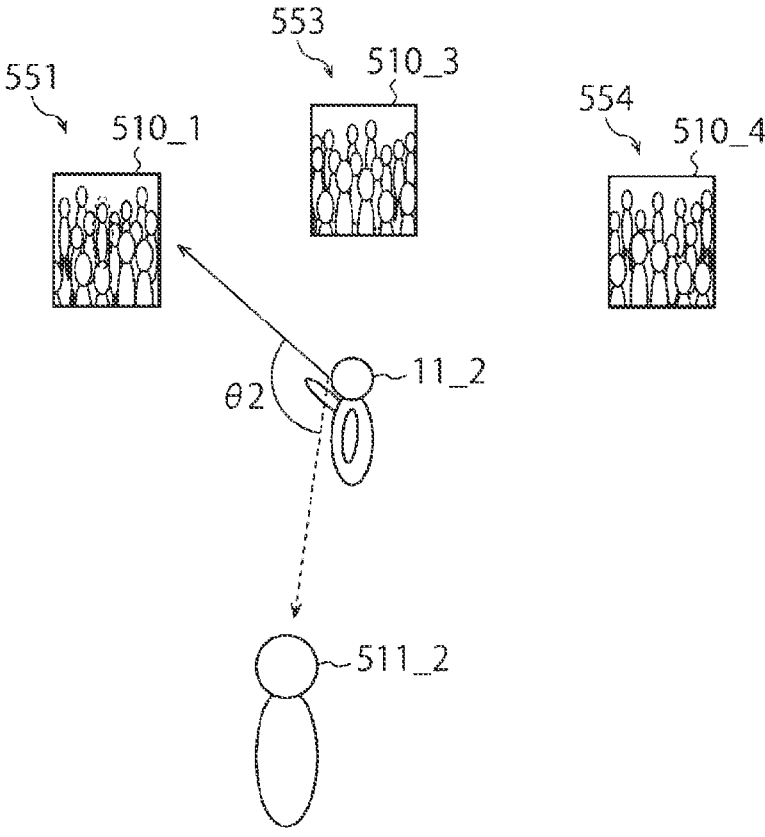

FIG. 12B illustrates an example of correction of the motion of the performer avatar 11_2 in the virtual space (referred to as a virtual space 500_2) other than the virtual space 500_1. The audience avatar 511_2 is an arbitrary audience avatar in the virtual space 500_2. In the virtual space 500_2, screen objects (such as back screens) 551, 553, and 554 indicating states in the other virtual spaces 500_1, 500_3, and 500_4 are disposed. In the screen objects 551, 553, and 554, the audience avatar groups 510_1, 510_3, and 510_4 in the virtual spaces 500_1, 500_3, and 500_4 are displayed. The motion information of the performer is edited (the motion of the performer avatar 11_2 is corrected) such that the performer avatar 11_2 performs a motion of waving the hand while looking at the screen object 551 including the audience avatar 511_1 that the performer is looking at. That is, the motion information of the performer is edited (the motion of the performer avatar 11_2 is corrected) on the basis of a positional relationship (third positional relationship) between the performer avatar 11_2 and the screen object 551. For example, the motion information of the performer is edited (the motion of the performer avatar 11_2 is corrected) such that the performer avatar 11_2 performs a motion of waving the hand while looking at the audience avatar 511_1 in the screen object 551. In the other virtual spaces 500_3 and 500_4, the motion of the performer avatar may be corrected in a similar manner.

The motion editing unit 350 may determine whether to edit the motion information according to the magnitude of a difference (angle difference) θ2 between a direction of the audience avatar 511_2 and a direction of the screen object 551 or a direction of the audience avatar 511_1 included in the screen object 551 (refer to FIG. 12B). For example, the motion information may be edited in a case where the angle difference θ2 is equal to or less than a threshold, and the motion information may not be edited in a case where the angle difference θ2 is greater than the threshold.

In the example of FIG. 12B, the number of screen objects is three, but may be one, two, or three or more. For example, in a case where there is one screen object, the virtual space displayed on the screen object may be switched according to a time. In this case, the motion of the performer avatar 11_2 may be corrected only in a case where the audience avatar 511_1 that the performer is looking at is displayed, and the motion of the performer avatar 11_2 may not be corrected in other cases. Alternatively, in a case where the audience avatar 511_1 is not displayed on the screen object, the virtual space in which the audience avatar 511_1 is present may be forced to be displayed on the screen object, and the motion of the performer avatar 11_2 may be corrected.

Figure 13:
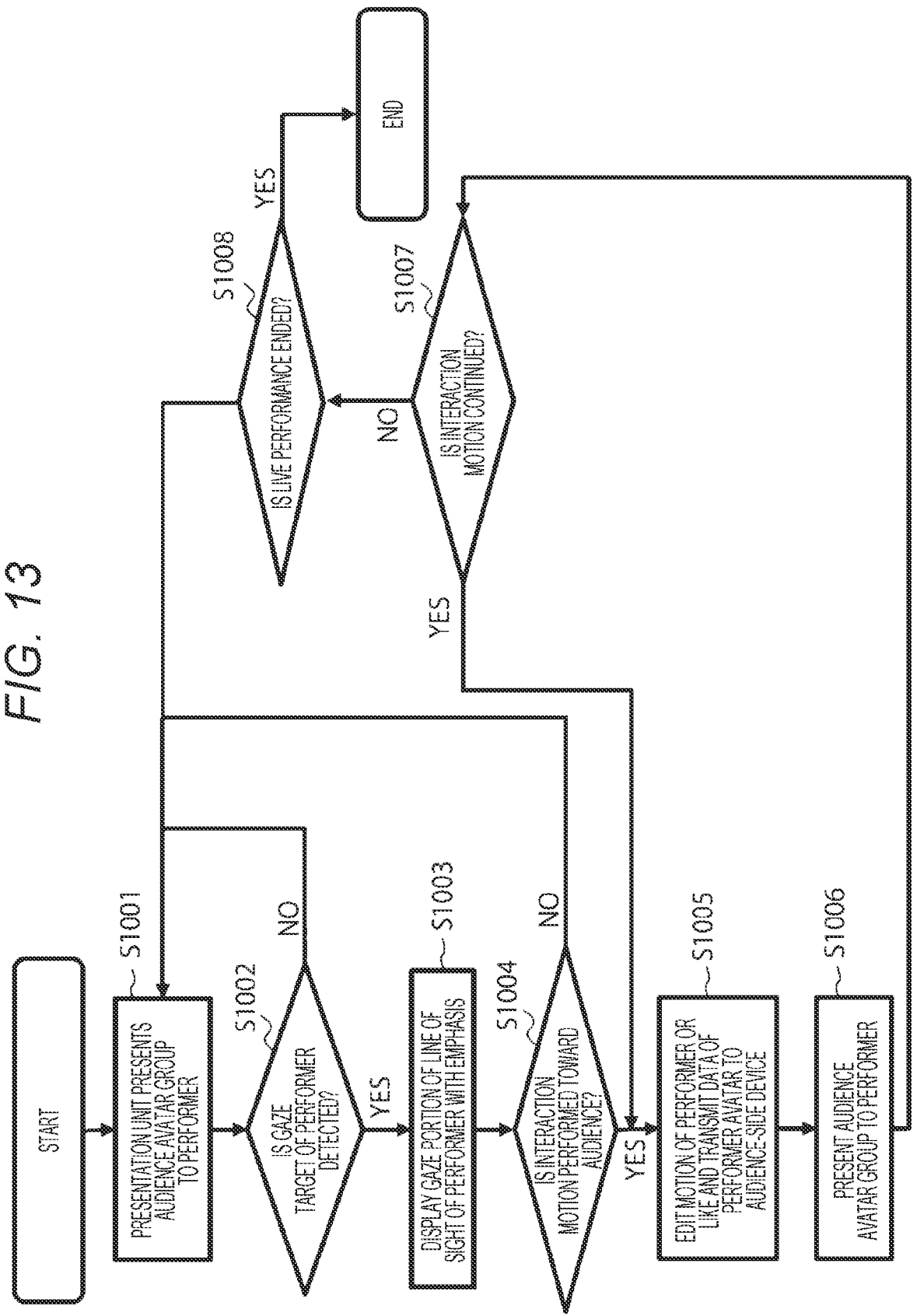
FIG. 13 is a flowchart illustrating an example of a processing flow of an information processing device according to the embodiment of the present disclosure.

FIG. 13 is a flowchart illustrating an example of a processing flow of the information processing system 100 according to the embodiment of the present disclosure.

First, the presentation unit 200 presents the image of the audience avatar group in the virtual space 500 to the performer 10 (S1001). At this time, the presentation unit 200 may synthesize the images representing the audience avatar for each virtual space on the basis of the data received by the data reception unit 380. The image representing the audience avatar may be an image obtained by imaging the audience member or an image of a character selected by the audience member.

Next, the line-of-sight acquisition unit 320 acquires line-of-sight information of the performer 10, and detects a gaze target (S1002). In a case where the gaze target can be detected, the processing proceeds to step S1003, and in a case where the gaze target cannot be acquired, the processing returns to step S1001.

Next, the presentation unit 200 displays the gaze portion of the performer with emphasis (S1003). Next, the motion editing unit 350 determines whether the performer performs a specific motion (here, referred to as an interaction motion) for the audience on the basis of the motion information of the performer 10 acquired by the motion acquisition unit 310 (S1004). Examples of interaction motion can be arbitrarily defined, for example, waving a hand, beckoning, winking, tilting a head, dancing, rotating, and the like. A target of the interaction motion is a specific audience avatar, a specific audience avatar group, or the like. The audience avatar group may be not only in one virtual space, but also in a plurality of the virtual spaces. For example, the performer may perform a motion of waving a hand over guest seats of the same floor in a plurality of the virtual spaces. In a case where the motion is the interaction motion, the processing proceeds to step S1005, and in a case where the motion is not the interaction motion, the processing returns to step S1001. Whether or not the interaction motion has been performed may be determined, for example, on the basis of prediction obtained by a machine learning method using the motion of the performer from the near past to the present.

Next, the motion editing unit 350 edits the motion information of the performer for each audience member, for each audience group, or for each virtual space on the basis of the line-of-sight information of the performer, the first positional relationship, the second positional relationship, and the like, and the image data generation unit 360 generates data of the performer avatar on the basis of the corrected motion information. The data delivery unit 370 transmits the data of the performer avatar to each audience-side device 400 (S1005). In a case where the audience avatar group that the performer looks at extends over a plurality of the virtual spaces, the above-described motion of the performer avatar is only required to be corrected (motion information is only required to be edited) for the audience avatar or audience avatar group the performer looks at in each of a plurality of the virtual spaces.

Next, the data reception unit 380 receives the image representing the audience avatar transmitted from the audience-side device 400, and the presentation unit 200 presents the audience avatar group 510 to the performer 10 (S1006). Therefore, the performer 10 can see the reaction of the audience to the interaction motion performed to the audience avatar. Note that, in the audience-side device 400, the motion of the audience member is reflected in the audience avatar. For example, when the audience member faces the right, the audience avatar also faces the right, and when the audience member waves a hand, the audience avatar also waves a hand.

Next, the motion editing unit 350 determines whether the interaction motion has ended (S1007). When the interaction motion continues, the processing returns to step S1005. When the interaction motion ends, it is determined whether the live performance of the performer has ended (S1008). When the live performance of the performer does not end, the processing returns to step S1001. In a case where the live performance has ended, the processing of the present flow-chart is ended.

FIG. 14 is a flowchart illustrating an example of a flow of motion editing processing of the information processing system 100 according to the embodiment of the present disclosure. In the description of the flowchart, a situation is assumed in which the performer 10 performs an interaction motion of directing a hand toward the audience avatar 511_1 in the virtual space 500_1 among four virtual spaces (refer to FIG. 11).

First, the motion editing unit 350 specifies, in the virtual space 500_1, a direction corresponding to a direction in which the performer 10 directs a hand toward the audience avatar 511_1 presented by the presentation unit 200 (the performer 10 is looking further in this direction). A difference (angle difference) e between the specified direction and the direction of the performer avatar 11_1 with respect to the audience avatar 511_1 in the virtual space 500_1 is calculated (S1101).

Next, the motion editing unit 350 determines whether the difference $\theta$ is equal to or less than a threshold (S1102). Here, the threshold is a value for determining whether or not the motion of the performer avatar 11_1 becomes unnatural as viewed from the audience member of the audience avatar 511_1 in a case where the motion of the performer avatar 11_1 is corrected. In a case where the difference $\theta$ is equal to or less than the threshold, the processing proceeds to step S1104, and in a case where the difference $\theta$ is greater than the threshold, the processing proceeds to step S1103.

Next, the motion editing unit 350 does not edit the motion information (correction of the motion) (alternatively, the editing of the motion information is canceled) (S1103).

Next, the motion editing unit 350 edits the motion information of the performer according to the magnitude of the difference $\theta$ (corrects the motion of the performer avatar 11_1) (S1104).

Next, the image data generation unit 360 generates data of the performer avatar on the basis of the corrected motion information (or uncorrected motion information), and the data delivery unit 370 transmits the data of the performer avatar to the audience-side device 400 (S1105). Here, it is assumed that the data of the performer avatar is data indicating a motion of the performer avatar. The audience-side device 400 receives the data (motion data) of the performer avatar and causes the performer avatar 11_1 to perform a motion on the basis of the motion data (S1106). The performer avatar 11_1 that performs the motion is presented to the audience (S1106).

FIG. 15 is a flowchart illustrating another example of a flow of the motion editing processing of the information processing system 100 according to the embodiment of the present disclosure. Steps S1201 to S1204 are the same as steps S1101 to S1104 in FIG. 14.

The image data generation unit 360 corrects the three-dimensional model (or two-dimensional model) of the performer avatar on the basis of the motion information of the performer, and transmits the image data obtained by rendering the corrected three-dimensional model to the audience-side device 400 via the data delivery unit 370 (S1205). The audience-side device 400 receives the image data and reproduces the image data to present the performer avatar to the audience (S1206).

FIG. 16 is a flowchart illustrating still another example of a flow of the motion editing processing of the information processing device according to the embodiment of the present disclosure. In this example, the motion of the performer avatar 11 is additionally edited according to the attribute information of the virtual space 500. Steps S1301 to S1304 are the same as steps S1101 to S1104 in FIG. 14.

Next, the motion editing unit 350 determines whether the motion of the performer avatar 11 is to be edited on the basis of the attribute information of the virtual space (S1305). The processing proceeds to step S1306 in a case where the motion is to be edited, and the processing proceeds to step S1307 in a case where the motion is not to be edited.

Next, the motion editing unit 350 edits the motion of the performer avatar 11 according to the attribute information of the virtual space (S1306). For example, in a case where the motion performed by the performer 10 is a beckoning gesture with the palm facing downward, the motion of the performer avatar 11 is edited to a motion in which the palm faces upward and the wrist is bent according to the culture of the linguistic area of the virtual space 500.

Next, the motion editing unit 350 further edits the motion of the performer avatar 11 to be edited (S1306).

Steps S1307 and S1308 are the same as steps S1105 and S1106 in FIG. 14.

As described above, according to the information processing device of the present disclosure, by controlling the performer avatar according to the positional relationship between the performer 10 and the audience avatar presented by the presentation unit 200, the intention of the motion of the performer can be correctly reflected in the performer avatar 11.

(Modification Example)

Next, the modification example of the presentation unit 200 will be described.

Figures 17A, 17B:
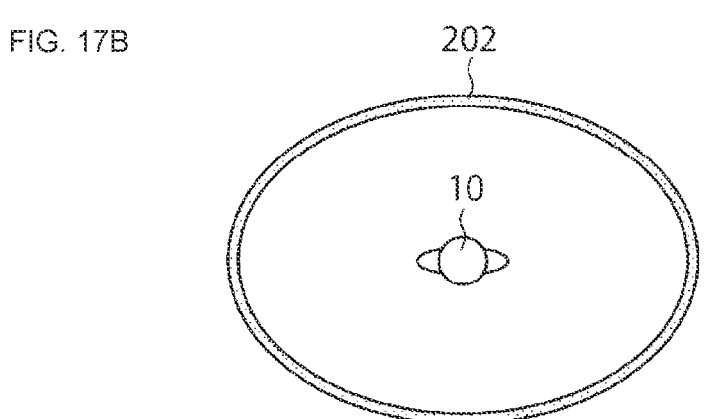
FIGS. 17A and 17B are views illustrating an example of a modification example of a presentation unit according to the embodiment of the present disclosure.

FIGS. 17A and 17B are views illustrating a presentation unit 202 as the modification example of the presentation unit 200 according to the embodiment of the present disclosure.

As illustrated in FIG. 17A, the presentation unit 202 is disposed so as to stack a plurality of circumferential display panels 202_1, 202_2, 202_3, and 202_4. Each of the display panels 202_1, 202_2, 202_3, and 202_4 displays a corresponding state (audience groups, guest seats, and the like) in the virtual space. As illustrated in FIG. 17B, the presentation unit 202 has a substantially elliptical shape or a substantially circular shape surrounding the periphery of the performer 10 when viewed from above.

In a case where the guest seats in each virtual space circumferentially surround the stage, the performer 10 can visually recognize the audience avatar in the same positional relationship as the virtual space. The performer 10 can more intuitively interact with the audience.

Figure 18:
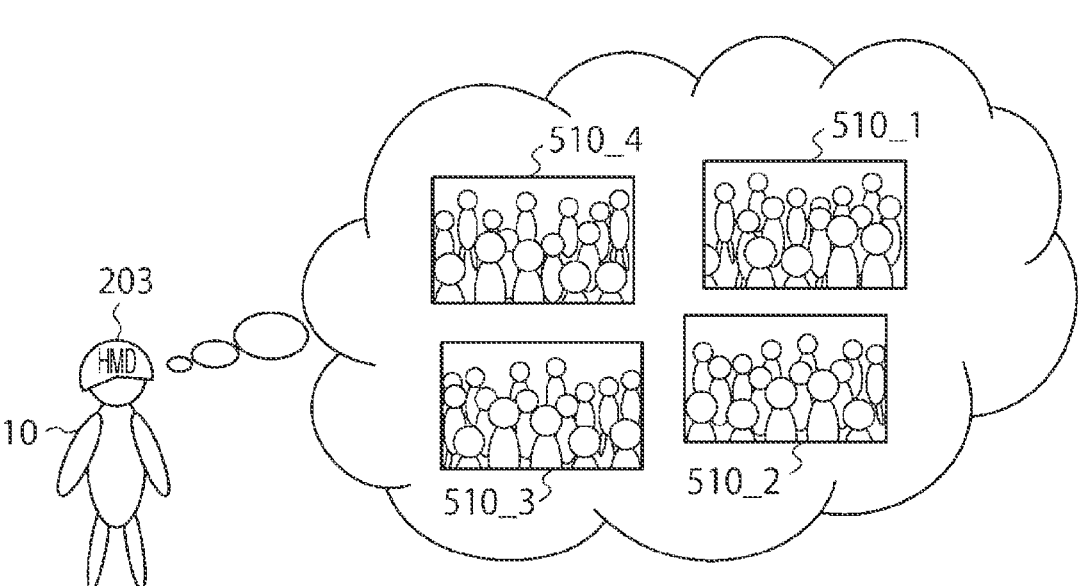
FIG. 18 is a view illustrating an example of a modification example of a presentation unit of an HMD according to the embodiment of the present disclosure.

FIG. 18 illustrates a presentation unit 203 as another modification example of the presentation unit 200 according to the embodiment of the present disclosure. The presentation unit 203 may be a head mounted display (HMD) as illustrated in FIG. 18. The presentation unit 203 can freely dispose the states of the four virtual spaces in the field of view and allow the performer 10 to visually recognize the audience avatar groups 510_1 to 510_4 in the four virtual spaces.

Figure 19:
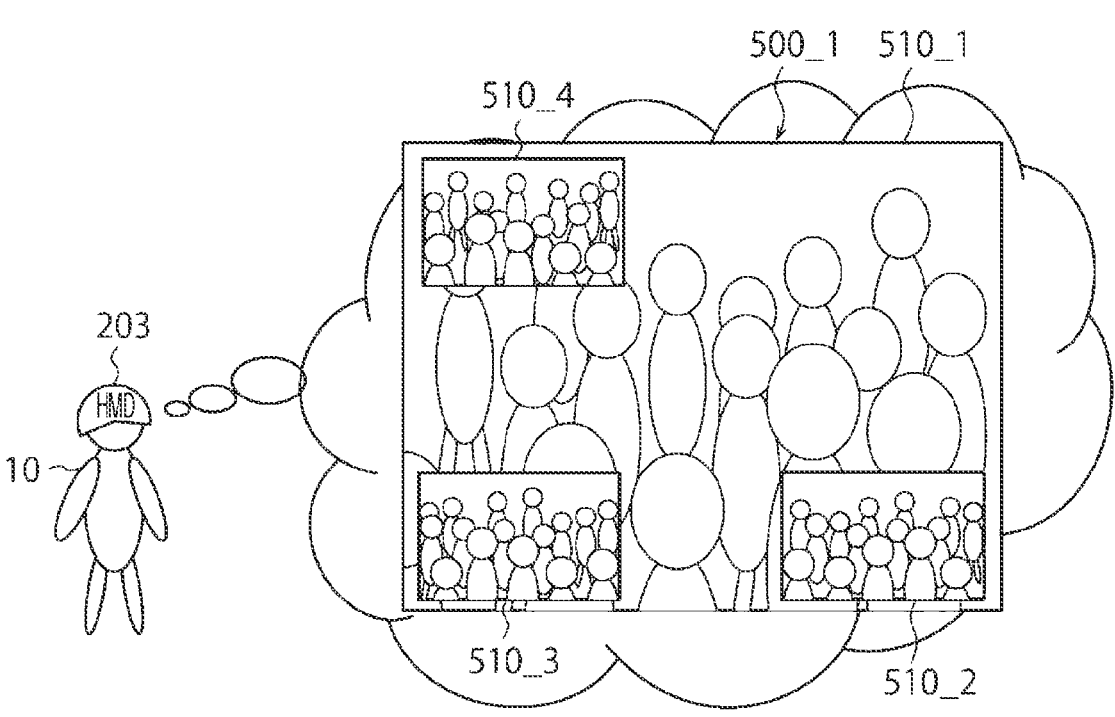
FIG. 19 is a view illustrating an example of display of a virtual space in FIG. 18.

FIG. 19 is a view illustrating another display example of the four virtual spaces presented by the presentation unit 203.

Furthermore, the state of the virtual space 500_1 including the audience avatar that the performer looks at may be displayed on the entire screen, and the state of the other virtual spaces may be displayed on small screens such that the state of the virtual space 500_1 is superimposed on the edge or the like of the entire screen.

[Application Example]

Hereinafter, an application example of the information processing system 100 will be described. Note that the above-described information processing system 100 can also be applied to any system, device, and method of the information processing system 100 below.

Figure 20:
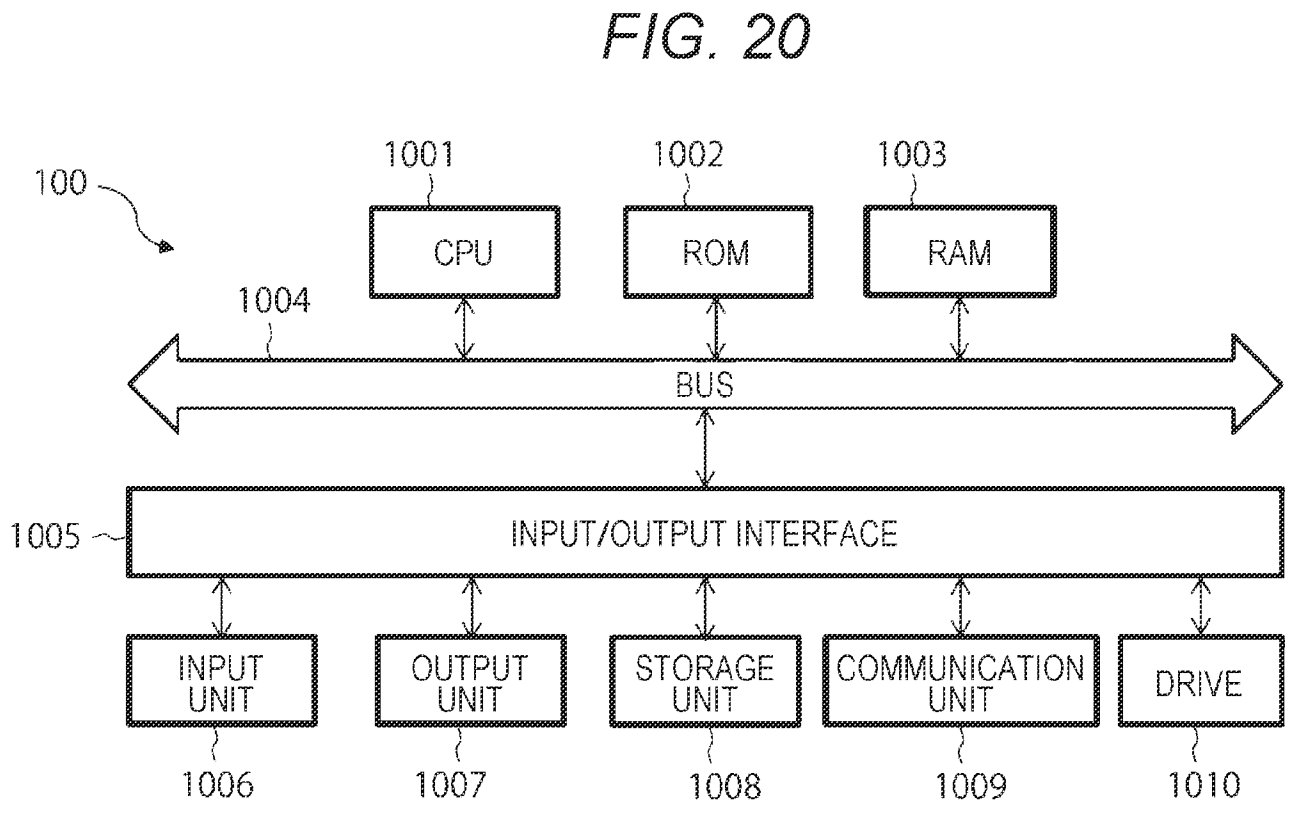

FIG. 20 illustrates an example of a configuration of hardware of a computer that executes a series of processing of the information processing system 100 according to the present disclosure with a program. In the computer, a CPU 1001, a ROM 1002, and a RAM 1003 are connected to one another via a bus 1004.

An input/output interface 1005 is also connected to the bus 1004. An input unit 1006, an output unit 1007, a storage unit 1008, a communication unit 1009, and a drive 1010 are connected to the input/output interface 1005.

The input unit 1006 includes, for example, a keyboard, a mouse, a microphone, a touch panel, and an input terminal. The output unit 1007 includes, for example, a display, a speaker, and an output terminal. The storage unit 1008 includes, for example, a hard disk, a RAM disk, and a nonvolatile memory. The communication unit 1009 includes, for example, a network interface. The drive drives a removable medium such as a magnetic disk, an optical disk, a magneto-optical disk, or a semiconductor memory.

In the computer configured as described above, for example, the CPU 1001 loads a program stored in the storage unit 1008 into the RAM 1003 via the input/output interface 1005 and the bus 1004 and executes the program, and thus the above-described series of processing is performed. Furthermore, the RAM 1003 also appropriately stores data necessary for the CPU 1001 to execute various processing, and the like.

The program executed by the computer can be applied by being recorded on, for example, the removable medium as a package medium or the like. In this case, the program can be installed in the storage unit 1008 via the input/output interface 1005 by attaching the removable medium to the drive 1010.

Furthermore, this program can also be provided via a wired or wireless transmission medium such as a local area network, the Internet, or digital satellite broadcasting. In this case, the program can be received by the communication unit 1009 and installed in the storage unit 1008.

The steps of the processing disclosed in the present description may not necessarily be performed in the order described in the flowchart. For example, the steps may be executed in an order different from the order described in the flowchart, or some of the steps described in the flowchart may be executed in parallel.

Note that the present invention is not limited to the embodiments described above as they are, and can be embodied by modifying the constituent elements without departing from the gist thereof in the implementation stage. Furthermore, various inventions can be formed by appropriately combining the plurality of constituent elements disclosed in the embodiments described above. For example, some components may be deleted from all the components illustrated in the embodiments. Moreover, the components of different embodiments may be appropriately combined.

Furthermore, the effects of the present disclosure described in the present specification are mere examples, and other effects may be provided.

Note that the present disclosure can have the following configurations.

[Item 1]

An information processing device including:

a presentation unit configured to present an audience avatar group disposed in at least one virtual space in a display region visually recognizable by a performer corresponding to a performer avatar disposed in the virtual space; and a control unit configured to control the performer avatar in the at least one virtual space on the basis of a motion of the performer with respect to the audience avatar group represented by the image presented in the display region.

[Item 2]

The information processing device according to Item 1, in which the control unit controls the performer avatar in the at least one virtual space on the basis of a first positional relationship between the performer and the audience avatar group represented by the image presented in the display region and a second positional relationship between the performer avatar and the audience avatar group in the at least one virtual space.

[Item 3]

The information processing device according to Item 1 or 2, in which the at least one virtual space includes a plurality of the virtual spaces, and the presentation unit presents an image representing the audience avatar group for each of the virtual spaces in the display region, and the control unit controls the performer avatar for each of the virtual spaces.

[Item 4]

The information processing device according to Item 2, further including a specification unit configured to specify at least one first audience avatar that the performer looks at in the audience avatar group represented by the image presented in the display region, in which the first positional relationship is a positional relationship between the performer and the first audience avatar represented by the image, and the control unit controls the performer avatar in the first virtual space on the basis of the first positional relationship and the second positional relationship between the first audience avatar and the performer avatar in a first virtual space that is the virtual space including the first audience avatar.

[Item 5]

The information processing device according to Item 4, in which the specification unit specifies the first audience avatar on the basis of line-of-sight information of the performer.

[Item 6]

The information processing device according to Item 4 or 5, in which the first audience avatar includes at least one audience avatar of the audience avatar group in any one of the virtual spaces.

[Item 7]

The information processing device according to any one of Items 4 to 6, in which the first audience avatar includes at least one audience avatar of the audience avatar group in each of two or more of the virtual spaces.

[Item 8]

The information processing device according to any one of Items 4 to 7, in which a screen object including at least a part of the audience avatar group in the first virtual space is displayed in a second virtual space that is the virtual space not including the first audience avatar, and the control unit controls the performer avatar in the second virtual space on the basis of a third positional relationship between the screen object and the performer avatar in the second virtual space and the first positional relationship.

[Item 9]

The information processing device according to Item 8, further including an acquisition unit configured to acquire a motion of the performer, in which the control unit controls the performer avatar in the second virtual space on the basis of the motion of the performer, and the control unit corrects the motion of the performer avatar in the second virtual space in a direction of the screen object.

[Item 10]

The information processing device according to Item 8 or 9, in which the control unit determines whether the motion of the performer is an interaction motion, and corrects the motion of the performer avatar only in a case of the interaction motion.

[Item 11]

The information processing device according to any one of Items 8 to 11, in which the control unit corrects a motion of the performer avatar in accordance with a difference between a direction in which the performer avatar faces and a direction of the screen object from the performer avatar.

[Item 12]

The information processing device according to Item 11, in which the control unit corrects the motion of the performer avatar in a case where the difference is equal to or less than a threshold, and does not correct the motion of the performer avatar in a case where the difference is greater than the threshold.

[Item 13]

The information processing device according to any one of Items 3 to 12, in which attribute information is set for each of the virtual spaces, and the control unit changes a motion of the performer avatar in accordance with the attribute information of the virtual space.

[Item 14]

The information processing device according to Item 13, in which the attribute information is based on a use language or a residential area of an audience group corresponding to the audience avatar group included in the virtual space.

[Item 15]

The information processing device according to any one of Items 1 to 14, in which the control unit transmits motion data indicating a motion of the performer avatar to at least one terminal device that causes the performer avatar in the virtual space to perform a motion on the basis of the motion data and provides a field-of-view image to an audience group corresponding to the audience avatar group on the basis of a virtual viewpoint set in the virtual space.

[Item 16]

The information processing device according to any one of Items 1 to 15, in which the control unit transmits an image representing the performer avatar to at least one terminal device that disposes the performer avatar indicated by the image in the virtual space and provides a field-of-view image to an audience group corresponding to the audience avatar group on the basis of a virtual viewpoint set in the virtual space.

[Item 17]

The information processing device according to any one of Items 1 to 16, in which the presentation unit includes a display unit disposed in front of the performer, a display unit having a shape surrounding a periphery of the performer, or a display unit of a head mounted device worn by the performer.

[Item 18]

The information processing device according to any one of Items 1 to 17, in which the control unit receives image data obtained by imaging the audience group from at least one terminal device of an audience group corresponding to the audience avatar group, and the presentation unit presents an image of the audience group indicated by the image data as the image representing the audience avatar group.

[Item 19]

An information processing method including:

presenting an image representing an audience avatar group disposed in at least one virtual space in a display region visually recognizable by a performer corresponding to a performer avatar disposed in the virtual space; and controlling the performer avatar in the at least one virtual space on the basis of a motion of the performer with respect to the audience avatar group represented by the image presented in the display region.

[Item 20]

A computer program for causing a computer to execute:

a step of presenting an image representing an audience avatar group disposed in at least one virtual space in a display region visually recognizable by a performer corresponding to a performer avatar disposed in the virtual space; and a step of controlling the performer avatar in the at least one virtual space on the basis of a motion of the performer with respect to the audience avatar group represented by the image presented in the display region.

REFERENCE SIGNS LIST

10 Performer
11 Performer avatar
12 Content
100 Information processing system
200, 203 Presentation unit
300 Performer-side device
310 Motion acquisition unit
320 Line-of-sight acquisition unit
321 Camera
330 First positional relationship calculation unit
340 Second positional relationship calculation unit
350 Motion editing unit
360 Image data generation unit 370 Data delivery unit
380, 410 Data reception unit
390 Audience image synthesis unit
400 Audience-side device
401 Display
402 Head mounted display
420 Audience presentation unit
430 Audience image generation unit
440 Audience-side transmission unit
500 Virtual space
510 Audience avatar group
511, 512 Audience avatar
520 Stage
530, 531 Guest seat
1001 CPU
1002 ROM
1003 RAM
1004 Bus
1005 Input/output interface
1006 Input unit
1007 Output unit
1008 Storage unit
1009 Communication unit
1010 Drive

The invention claimed is:

1. An information processing device, comprising:

a presentation unit configured to present a first image that represents an audience avatar group, wherein the audience avatar group is in a first virtual space of a plurality of virtual spaces, the first virtual space is in a display region, the audience avatar group is visually recognizable by a performer, and the performer corresponds to a performer avatar that is in the first virtual space;

an acquisition unit configured to acquire a motion of the performer; and a control unit configured to:

control the performer avatar in the first virtual space based on the motion of the performer with respect to the audience avatar group;

control, based on the motion of the performer, the performer avatar in a second virtual space of the plurality of virtual spaces, wherein the second virtual space displays at least a part of the audience avatar group, and the second virtual space is different from the first virtual space; and correct a motion of the performer avatar in the second virtual space in a first direction of a screen object, wherein the screen object includes the part of the audience avatar group.

2. The information processing device according to claim 1, wherein the control unit is further configured to control the performer avatar based on a first positional relationship and a second positional relationship, the first positional relationship is between the performer and the audience avatar group, the second positional relationship is between the performer avatar and the audience avatar group in the first virtual space, and the second positional relationship is different from the first positional relationship.

3. The information processing device according to claim 2, further comprising a specification unit configured to specify at least a first audience avatar of the audience avatar group, wherein the performer looks at the first audience avatar, the first positional relationship is between the performer and the first audience avatar, and the control unit is further configured to control the performer avatar in the first virtual space based on the first positional relationship and the second positional relationship.

4. The information processing device according to claim 3, wherein the specification unit is further configured to specify the first audience avatar based on line-of-sight information of the performer.

5. The information processing device according to claim 3, wherein the first audience avatar includes at least one audience avatar of the audience avatar group in at least one of the plurality of virtual spaces.

6. The information processing device according to claim 3, wherein the first audience avatar includes at least one audience avatar of the audience avatar group in at least two of the plurality of virtual spaces.

7. The information processing device according to claim 3, wherein the second virtual space does not include the first audience avatar, the control unit is further configured to control the performer avatar in the second virtual space based on each of a third positional relationship and the first positional relationship, and the third positional relationship is between the screen object and the performer avatar in the second virtual space.

8. The information processing device according to claim 1, wherein the presentation unit is further configured to present, in the display region, a second image that represents the audience avatar group for each of the plurality of virtual spaces, the second image is different from the first image, and the control unit is further configured to control the performer avatar for each of the plurality of virtual spaces.

9. The information processing device according to claim 8, wherein each of the plurality of virtual spaces is associated with attribute information, and the control unit is further configured to change the motion of the performer avatar based on the attribute information of each of the plurality of virtual spaces.

10. The information processing device according to claim 9, wherein the attribute information is based on at least one of a use language of an audience group or a residential area of the audience group, and the audience avatar group is associated with the audience group.

11. The information processing device according to claim 1, wherein the control unit is further configured to:

determine whether the motion of the performer that corresponds to an interaction motion; and correct, based on the determined interaction motion, the motion of the performer avatar.

12. The information processing device according to claim 1, wherein the control unit is further configured to correct, based on a difference between the first direction and a second direction, the motion of the performer avatar, the performer avatar faces in the second direction, and the screen object is in the first direction from the performer avatar.

13. The information processing device according to claim 12, wherein the control unit is further configured to correct the motion of the performer avatar based on the difference being equal to or less than a threshold.

14. The information processing device according to claim 1, wherein the control unit is further configured to transmit motion data to at least one terminal device, the motion data indicates the motion of the performer, the terminal device causes the performer avatar in the first virtual space, to perform the motion, based on the motion data, the terminal device provides a field-of-view image to an audience group based on a virtual viewpoint, the virtual viewpoint is set in the first virtual space, and the audience avatar group is associated with the audience group.

15. The information processing device according to claim 1, wherein the control unit is further configured to transmit a second image to at least one terminal device, the second image represents the performer avatar, the second image is different from the first image, the performer avatar is in the first virtual space, the terminal device provides a field-of-view image to an audience group based on a virtual viewpoint, the virtual viewpoint is set in the first virtual space, and the audience avatar group is associated with the audience group.

16. The information processing device according to claim 1, wherein the presentation unit includes one of:

a display unit in front of the performer, a display unit that surrounds a periphery of the performer, or a display unit of a head mounted device wearable by the performer.

17. The information processing device according to claim 1, wherein the control unit is further configured to receive image data of an audience group from at least one terminal device, the audience avatar group is associated with the audience group, the terminal device performs imaging of the audience group to obtain the image data, the presentation unit is further configured to present a second image of the audience group as the first image, and the image data indicates the second image.

18. An information processing method, comprising:

in an information processing device:

presenting an image representing an audience avatar group, wherein the audience avatar group is a first virtual space of a plurality of virtual spaces, the first virtual space is in a display region, the audience avatar group is visually recognizable by a performer, and the performer corresponds to a performer avatar that is in the first virtual space;

acquiring a motion of the performer:

controlling the performer avatar in the first virtual space based on the motion of the performer with respect to the audience avatar group;

controlling, based on the motion of the performer, the performer avatar in a second virtual space of the plurality of virtual spaces, wherein the second virtual space displays at least a part of the audience avatar group, and the second virtual space is different from the first virtual space; and correcting a motion of the performer avatar in the second virtual space in a direction of a screen object, wherein the screen object includes the part of the audience avatar group.

19. A non-transitory computer-readable medium having stored thereon, computer-executable instructions which, when executed by a computer, cause the computer to execute operations, the operations comprising:

presenting an image representing an audience avatar group, wherein the audience avatar group is in a first virtual space of a plurality of virtual spaces, the first virtual space is in a display region, the audience avatar group is visually recognizable by a performer, and the performer corresponds to a performer avatar that is in the first virtual space;

acquiring a motion of the performer;

controlling the performer avatar in the first virtual space based on the motion of the performer with respect to the audience avatar group;

controlling, based on the motion of the performer, the performer avatar in a second virtual space of the plurality of virtual spaces, wherein the second virtual space displays at least a part of the audience avatar group the second virtual space is different from the first virtual space; and correcting a motion of the performer avatar in the second virtual space in a direction of a screen object, wherein the screen object includes the part of the audience avatar group.

* * * * *